US009658728B2

(12) United States Patent
Kanazawa

(10) Patent No.: US 9,658,728 B2
(45) Date of Patent: May 23, 2017

(54) TOUCH PANEL CONTROLLER, INTEGRATED CIRCUIT, TOUCH PANEL DEVICE, AND ELECTRONIC DEVICE

(71) Applicant: SHARP KABUSHIKI KAISHA, Osaka-shi, Osaka (JP)

(72) Inventor: Yusuke Kanazawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 40 days.

(21) Appl. No.: 14/889,765

(22) PCT Filed: Apr. 9, 2014

(86) PCT No.: PCT/JP2014/060304
§ 371 (c)(1),
(2) Date: Nov. 6, 2015

(87) PCT Pub. No.: WO2014/203598
PCT Pub. Date: Dec. 24, 2014

(65) Prior Publication Data
US 2016/0132149 A1    May 12, 2016

(30) Foreign Application Priority Data

Jun. 20, 2013 (JP) .................................. 2013-129904

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ...................................................... G06F 3/044
See application file for complete search history.

(56) References Cited

U.S. PATENT DOCUMENTS

| 8,558,811 | B2 * | 10/2013 | Reynolds | G06F 3/041 |
| | | | | 178/18.06 |
| 8,605,054 | B2 * | 12/2013 | Krenik | G06F 3/0418 |
| | | | | 345/173 |
| 8,730,197 | B2 * | 5/2014 | Hamaguchi | G06F 3/0416 |
| | | | | 345/173 |
| 8,809,702 | B2 * | 8/2014 | Reynolds | G06F 3/041 |
| | | | | 178/18.06 |
| 8,902,192 | B2 * | 12/2014 | Miyamoto | G06F 3/044 |
| | | | | 345/174 |

(Continued)

FOREIGN PATENT DOCUMENTS

JP    2013-3603 A    1/2013

OTHER PUBLICATIONS

International Search Report, issued in PCT/JP2014/060304, dated Jun. 24, 2014.

(Continued)

*Primary Examiner* — Patrick F Marinelli
(74) *Attorney, Agent, or Firm* — Birch, Stewart, Kolasch & Birch, LLP

(57) ABSTRACT

Provided is a driving control unit (93) which performs control to switch high and low of correlation of code sequences output by driving signal generation units (4a to 4d) according to a detection distance which is a distance between a surface of a touch panel (2) and an object to be detected.

10 Claims, 19 Drawing Sheets

(56) References Cited

U.S. PATENT DOCUMENTS

| | | | |
|---|---|---|---|
| 8,937,609 B2* | 1/2015 | Yoshida | G06F 3/044 345/174 |
| 8,942,937 B2* | 1/2015 | Miyamoto | G06F 3/044 324/686 |
| 8,952,916 B2* | 2/2015 | Reynolds | G06F 3/041 178/19.07 |
| 8,970,538 B2* | 3/2015 | Yoshida | G06F 3/044 345/173 |
| 8,976,154 B2* | 3/2015 | Miyamoto | G06F 3/041 345/174 |
| 8,994,692 B2* | 3/2015 | Yumoto | G06F 3/044 178/18.06 |
| 9,001,066 B2* | 4/2015 | Mohindra | G06F 3/044 345/173 |
| 9,012,793 B2* | 4/2015 | Reynolds | G06F 3/041 178/18.06 |
| 9,013,448 B2* | 4/2015 | Miyamoto | G06F 3/0416 178/18.06 |
| 9,030,441 B2* | 5/2015 | Yumoto | G06F 3/041 178/18.06 |
| 9,146,632 B2* | 9/2015 | Miyamoto | G06F 3/044 |
| 9,189,118 B2* | 11/2015 | Kanazawa | G06F 3/0418 |
| 9,213,437 B2* | 12/2015 | Kanazawa | G06F 3/0416 |
| 9,223,439 B2* | 12/2015 | Hamaguchi | G06F 3/044 |
| 9,310,911 B2* | 4/2016 | Sugita | G06F 3/044 |
| 9,310,947 B2* | 4/2016 | Sugita | G06F 3/044 |
| 9,348,477 B2* | 5/2016 | Reynolds | G06F 3/041 |
| 9,354,757 B2* | 5/2016 | Miyamoto | G06F 3/0416 |
| 9,372,574 B2* | 6/2016 | Kanazawa | G06F 3/044 |
| 9,395,856 B2* | 7/2016 | Iizuka | G06F 3/0416 |
| 9,411,462 B2* | 8/2016 | Wright | G06F 3/03545 |
| 9,454,271 B2* | 9/2016 | Miyamoto | G06F 3/044 |
| 9,465,492 B2* | 10/2016 | Miyamoto | G06F 3/0416 |
| 9,477,360 B2* | 10/2016 | Hashimoto | G06F 3/044 |
| 9,495,056 B2* | 11/2016 | Takeda | G06F 3/03 |
| 9,501,091 B2* | 11/2016 | Takeda | G06F 3/03 |
| 9,501,451 B2* | 11/2016 | Miyamoto | G06F 3/0416 |
| 9,535,536 B2* | 1/2017 | Kanazawa | G06F 3/044 |
| 9,557,834 B2* | 1/2017 | Hamaguchi | G06F 3/0416 |
| 2012/0056841 A1* | 3/2012 | Krenik | G06F 3/044 345/174 |
| 2013/0093725 A1* | 4/2013 | Reynolds | G06F 3/041 345/174 |
| 2013/0211757 A1* | 8/2013 | Miyamoto | G06F 3/0416 702/65 |
| 2013/0271426 A1* | 10/2013 | Yumoto | G06F 3/041 345/174 |
| 2013/0321334 A1* | 12/2013 | Yoshida | G06F 3/0416 345/174 |
| 2014/0035874 A1* | 2/2014 | Iizuka | G06F 3/044 345/174 |
| 2014/0055413 A1* | 2/2014 | Krenik | G06F 3/044 345/174 |
| 2014/0085257 A1* | 3/2014 | Wright | G06F 3/03545 345/174 |
| 2014/0104236 A1* | 4/2014 | Hamaguchi | G06F 3/044 345/174 |
| 2014/0118287 A1* | 5/2014 | Miyamoto | G06F 3/044 345/173 |
| 2014/0125629 A1* | 5/2014 | Miyamoto | G06F 3/044 345/174 |
| 2014/0132541 A1* | 5/2014 | Miyamoto | G06F 3/041 345/173 |
| 2014/0132561 A1* | 5/2014 | Miyamoto | G06F 3/0418 345/174 |
| 2014/0132562 A1* | 5/2014 | Miyamoto | G06F 3/0418 345/174 |
| 2014/0139483 A1* | 5/2014 | Miyamoto | G06F 3/044 345/174 |
| 2014/0145996 A1* | 5/2014 | Sugita | G06F 3/044 345/173 |
| 2014/0149059 A1* | 5/2014 | Miyamoto | G06F 3/044 702/65 |
| 2014/0152602 A1* | 6/2014 | Miyamoto | G06F 3/0416 345/173 |
| 2014/0160070 A1* | 6/2014 | Miyamoto | G06F 3/0416 345/174 |
| 2014/0160071 A1* | 6/2014 | Reynolds | G06F 3/041 345/174 |
| 2014/0168144 A1* | 6/2014 | Reynolds | G06F 3/041 345/174 |
| 2014/0168145 A1* | 6/2014 | Reynolds | G06F 3/041 345/174 |
| 2014/0168161 A1* | 6/2014 | Sugita | G06F 3/044 345/174 |
| 2014/0218645 A1* | 8/2014 | Miyamoto | G06F 3/044 349/12 |
| 2014/0253508 A1* | 9/2014 | Yumoto | G06F 3/044 345/174 |
| 2014/0327644 A1* | 11/2014 | Mohindra | G06F 3/044 345/174 |
| 2014/0362046 A1* | 12/2014 | Yoshida | G06F 3/044 345/174 |
| 2015/0002463 A1* | 1/2015 | Kanazawa | G06F 3/044 345/174 |
| 2015/0054777 A1* | 2/2015 | Hashimoto | G06F 3/0412 345/174 |
| 2015/0138140 A1* | 5/2015 | Kanazawa | G06F 3/0416 345/174 |
| 2015/0185920 A1* | 7/2015 | Reynolds | G06F 3/041 345/174 |
| 2015/0268792 A1* | 9/2015 | Hamaguchi | G06F 3/044 345/174 |
| 2015/0301631 A1* | 10/2015 | Mirfakhraei | G06F 3/044 345/173 |
| 2015/0301682 A1* | 10/2015 | Kanazawa | G06F 3/0416 345/174 |
| 2015/0338955 A1* | 11/2015 | Hamaguchi | G06F 3/044 345/174 |
| 2015/0378478 A1* | 12/2015 | Sugita | G06F 3/0416 345/174 |
| 2016/0004351 A1* | 1/2016 | Kimura | G06F 3/1423 345/174 |
| 2016/0041645 A1* | 2/2016 | Ray | G06F 3/0418 345/174 |
| 2016/0041681 A1* | 2/2016 | Hamaguchi | G06F 3/044 345/174 |
| 2016/0070374 A1* | 3/2016 | Hamaguchi | G06F 3/0416 345/174 |
| 2016/0091919 A1* | 3/2016 | Takeda | G06F 3/03 345/174 |
| 2016/0092007 A1* | 3/2016 | Kanazawa | G06F 3/044 345/174 |
| 2016/0098124 A1* | 4/2016 | Takeda | G06F 3/03545 345/174 |
| 2016/0110022 A1* | 4/2016 | Kanazawa | G06F 3/044 345/174 |
| 2016/0117019 A1* | 4/2016 | Takeda | G06F 3/03 345/174 |
| 2016/0132149 A1* | 5/2016 | Kanazawa | G06F 3/0416 345/174 |
| 2016/0139732 A1* | 5/2016 | Takeda | G06F 3/044 345/174 |
| 2016/0188036 A1* | 6/2016 | Ahn | G06F 3/0416 345/174 |
| 2016/0306467 A1* | 10/2016 | Reynolds | G06F 3/041 |
| 2017/0024039 A1* | 1/2017 | Miyamoto | G06F 3/0416 |

OTHER PUBLICATIONS

Written Opinion of the International Searching Authority, issued in PCT/JP2014/060304, dated Jun. 24, 2014.

* cited by examiner

| THREE-VALUED M-SEQUENCES | drive 1 | drive 2 | drive 3 | drive 4 | drive 5 | drive 6 | drive 7 | drive 8 | drive 9 | drive 10 | drive 11 | drive 12 | drive 13 | drive 14 | drive 15 |
|---|---|---|---|---|---|---|---|---|---|---|---|---|---|---|---|
| 1st vector | 0 | 1 | -1 | 1 | 1 | 0 | -1 | 1 | 0 | 1 | 0 | 0 | -1 | -1 | 0 |
| 2nd vector | 0 | 0 | 0 | 0 | 1 | 1 | -1 | 0 | 0 | 1 | 0 | 0 | 0 | -1 | 0 |
| 3rd vector | -1 | 0 | -1 | -1 | 1 | -1 | 0 | -1 | 1 | 0 | 1 | 0 | 0 | -1 | -1 |
| 4th vector | 0 | 0 | 0 | 0 | 0 | -1 | 1 | -1 | 0 | 0 | -1 | 0 | 0 | 0 | -1 |
| 5th vector | 0 | -1 | 0 | 1 | -1 | 1 | 1 | 0 | -1 | 1 | 0 | 1 | 0 | 0 | 0 |
| 6th vector | -1 | 0 | -1 | 0 | 0 | 0 | 1 | 1 | 0 | -1 | 0 | 1 | -1 | 0 | 0 |
| 7th vector | -1 | -1 | 0 | 0 | 0 | -1 | 1 | 1 | 1 | 0 | 0 | 0 | 1 | 0 | 0 |
| 8th vector | -1 | -1 | -1 | -1 | 0 | 0 | 0 | 1 | 1 | 0 | 0 | 0 | 0 | 1 | 0 |
| 9th vector | 0 | 0 | -1 | 0 | 0 | 1 | 0 | 1 | 1 | 1 | -1 | 1 | 0 | 1 | 0 |
| 10th vector | 0 | 0 | 0 | 0 | 0 | 0 | 0 | 0 | 0 | 1 | 0 | -1 | 1 | 0 | 1 |
| 11th vector | 0 | 0 | 0 | 0 | -1 | 0 | 1 | 0 | 1 | -1 | -1 | -1 | 0 | 1 | 0 |
| 12th vector | 0 | 0 | 0 | -1 | 0 | 0 | 0 | -1 | 0 | 0 | 1 | -1 | 1 | 0 | 1 |
| 13th vector | 0 | 0 | 0 | 0 | 0 | 0 | -1 | 0 | 1 | 0 | 1 | 1 | 0 | -1 | 0 |
| 14th vector | 1 | 1 | 0 | 0 | 0 | 0 | 0 | 0 | 0 | 0 | -1 | 1 | -1 | -1 | 0 |
| 15th vector | 1 | 0 | 0 | 0 | 0 | 0 | 1 | 0 | 0 | -1 | 1 | 1 | -1 | 0 | 0 |
| 16th vector | 0 | 0 | 1 | 1 | 0 | 0 | 0 | 0 | 0 | 0 | 0 | 0 | 1 | -1 | -1 |
| 17th vector | 0 | 0 | 0 | 0 | 1 | 0 | -1 | -1 | 0 | 0 | 1 | 0 | 0 | 1 | -1 |
| 18th vector | 1 | 1 | 1 | 1 | 0 | 0 | 1 | 0 | 0 | 0 | 0 | 0 | 0 | 0 | 1 |
| 19th vector | 0 | 0 | 0 | 0 | 0 | 0 | 0 | -1 | 1 | 0 | 0 | 0 | 1 | 0 | 0 |
| 20th vector | -1 | 0 | 1 | 0 | 0 | 0 | 0 | 0 | 0 | -1 | 0 | 0 | 0 | 0 | -1 |
| 21st vector | -1 | -1 | 0 | 0 | 0 | 1 | -1 | 0 | 0 | 0 | 0 | 0 | 0 | -1 | 0 |
| 22nd vector | 0 | 0 | 1 | 1 | 0 | 0 | 1 | 0 | -1 | -1 | 0 | 0 | 1 | 0 | 0 |
| 23rd vector | 1 | 1 | 1 | 1 | -1 | 0 | 0 | 0 | 0 | 0 | 0 | -1 | 0 | 1 | 0 |
| 24th vector | 1 | 0 | 0 | 0 | 0 | 1 | 0 | 0 | 0 | 0 | -1 | 0 | 0 | 0 | 0 |
| 25th vector | 1 | 1 | 0 | -1 | -1 | 0 | -1 | 0 | 0 | -1 | -1 | 0 | 0 | -1 | 0 |
| 26th vector | 1 | 0 | 1 | 0 | -1 | 0 | 0 | -1 | 0 | 0 | 0 | 0 | 0 | 0 | 0 |
| 27th vector | 0 | -1 | -1 | 0 | 0 | 1 | 1 | 0 | 0 | 0 | -1 | 0 | 0 | -1 | -1 |
| 28th vector | -1 | 0 | 1 | 1 | -1 | -1 | 0 | 1 | 0 | 0 | -1 | -1 | -1 | 0 | 0 |
| 29th vector | 0 | 0 | 1 | -1 | 0 | 0 | 0 | 1 | 0 | 0 | 0 | 0 | 0 | 0 | 0 |
| 30th vector | 1 | -1 | 1 | -1 | -1 | -1 | 1 | 1 | -1 | 0 | 0 | -1 | -1 | -1 | 0 |
| 31st vector | 0 | 0 | 0 | -1 | -1 | 0 | 0 | 0 | -1 | 0 | 0 | 0 | -1 | 0 | -1 |

TOUCH PANEL CONTROLLER, INTEGRATED CIRCUIT, TOUCH PANEL DEVICE, AND ELECTRONIC DEVICE

TECHNICAL FIELD

The present invention relates to a touch panel controller, an integrated circuit including (integrated with) the touch panel controller, a touch panel device, and an electronic device.

BACKGROUND ART

As a device which detects (estimates) capacitance values of electrostatic capacitances which are distributed (arranged) in a matrix manner, PTL 1 discloses a touch panel device which detects distribution of capacitance values of respective electrostatic capacitances of an electrostatic capacitance matrix formed in a vicinity of intersections of M drive lines (M is an integer of 2 or more) and L sense lines (L is an integer of 2 or more). When a touch panel is touched with a finger or a pen by a user, the touch panel device detects a change (for example, decrease) in a capacitance value of an electrostatic capacitance at the touched position to thereby detect a position on the touch panel, which is touched by the user.

CITATION LIST

Patent Literature

PTL 1: Japanese Unexamined Patent Application Publication No. 2013-3603 (Published on Jan. 7, 2013)

SUMMARY OF INVENTION

Technical Problem

Here, a touch panel system 61 described in PTL 1 will be explained with reference to FIG. 19. FIG. 19 is a circuit diagram illustrating a configuration of the touch panel system 61 according to PTL 1.

The touch panel system 61 includes a touch panel 52 and a touch panel controller 63. The touch panel 52 includes drive lines DL1 to DL4 and sense lines SL1 to SL4. Electrostatic capacitances C11 to C44 are formed at positions where the drive lines DL1 to DL4 and the sense lines SL1 to SL4 intersect with each other.

The touch panel controller 63 is provided with a driving unit 54. The driving unit 54 drives the drive lines based on code sequences MC1 illustrated in FIG. 13. PTL 1 indicates an example that M-sequences with a sequence length of 31 as illustrated in FIG. 13 is used as a code sequence. Here, description will be given by assuming that Drives 1 to 4 in the sequences illustrated in FIG. 13 are allocated as a plurality of driving signals which drive the drive lines DL1 to DL4. Elements of the code sequences are either "1" or "−1". The driving unit 54 applies a voltage Vdrive when the element of the code sequence is "1", and applies −Vdrive when the element is "−1". For example, a power supply voltage is used for the voltage Vdrive. Moreover, it may be a voltage other than the power supply voltage, such as a reference voltage.

The touch panel system 61 has at least two differential amplifiers 55 which are arranged at positions corresponding to the respective sense lines SL1 to SL4. The differential amplifiers 55 receive linear sum signals X1, X2, X3 and X4 which are output from sense lines having electrostatic capacitances driven by the driving unit 54, and amplifies differences thereof.

For example, in first driving, the driving unit 54 applies the voltage Vdrive to the drive lines DL1, DL3 and DL4 and applies the −Vdrive to the drive line DL2 in driving with a 1st Vector of the code sequences of FIG. 13. At this time, an output Y of the differential amplifier 55 to which the sense lines SL3 and SL4 are connected is provided by

[Expression 1]

$$Y = \frac{V_{drive}C_{31} - V_{drive}C_{32} + V_{drive}C_{33} + V_{drive}C_{34}}{C_{int}} - \frac{V_{drive}C_{41} - V_{drive}C_{42} + V_{drive}C_{43} + V_{drive}C_{44}}{C_{int}}$$

$$= \frac{V_{drive}}{C_{int}} \left[ \begin{array}{c} (C_{31} - C_{41}) - (C_{32} - C_{42}) + \\ (C_{33} - C_{43}) + (C_{34} - C_{44}) \end{array} \right].$$

When sequences used for i-th driving, which are provided to the drive lines DL1 to 4, in the code sequences of FIG. 13 are $D_{i1}$, $D_{i2}$, $D_{i3}$ and $D_{i4}$, respectively, the output Y of the differential amplifier 55 is provided by

[Expression 2]

$$Y = \frac{V_{drive}}{C_{int}} [D_{i,1}(C_{31} - C_{41}) -$$

$$D_{i,2}(C_{32} - C_{42}) + D_{i,3}(C_{33} - C_{43}) + D_{i,4}(C_{34} - C_{44})].$$

In the touch panel system 61 described in PTL 1, electrostatic capacitances of the touch panel system 61 are able to be estimated (specified) by executing computation of an inner product of a signal based on an output signal of the differential amplifier 55 and the code sequences. For example, when the electrostatic capacitances C31 to C41 are estimated by using the code sequence used for driving of the drive line DL1, an inner product of thirty-one linear sum signals Yi (i=1 . . . 31) and the code sequence $D_{i1}$, which are obtained by performing the aforementioned driving thirty one times (in which the $1^{st}$ vector to a 31st vector are used), is calculated as

[Expression 3]

$$\sum_{i=1}^{31} Y_i D_{i,1} = \qquad \text{formula (A)}$$

$$\sum_{i=1}^{31} \frac{V_{drive}}{C_{int}} D_{i,1} [D_{i,1}(C_{31} - C_{41}) + D_{i,2}(C_{32} - C_{42}) +$$

$$D_{i,3}(C_{33} - C_{43}) + D_{i,4}(C_{34} - C_{44})].$$

An M-sequence code is known that an inner product of the same sequences takes the same value as a sequence length and an inner product of different sequences takes a value of "−1". Accordingly, the aforementioned formula (A) becomes

[Expression 4]

$$\sum_{i=1}^{31} Y_i D_{i,1} =$$

$$\frac{V_{drive}}{C_{int}} [31(C_{31} - C_{41}) - (C_{32} - C_{42}) - (C_{33} - C_{43}) - (C_{34} - C_{44})].$$

Here, if capacitance values of the electrostatic capacitances C31 to C44 have the almost same value by assuming that all the sense lines and all the drive lines are respectively created with a uniform width, a coefficient by which the electrostatic capacitances C31 to C41 are multiplied is thirty-one times larger than those of other electrostatic capacitances, so that an influence of other electrostatic capacitances becomes negligibly small and the aforementioned formula is able to be simplified as

[Expression 5]

$$\sum_{i=1}^{31} Y_i D_{i,1} \approx \frac{V_{drive}}{C_{int}} [31(C_{31} - C_{41})],$$

so that the electrostatic capacitances C31 to C41 are able to be estimated. In a technique described in PTL 1, by driving the electrostatic capacitances by a plurality of times (thirty one times in the example above), a greater signal is acquired and an influence of noise is reduced, thus making it possible to estimate capacitances more correctly. However, as an object to be detected, which is used for a touch input, becomes away from a surface of the touch panel, there is a difficulty (problem) that a change itself in electrostatic capacitances formed between sense lines and drive lines, which is caused by the touch input, decreases and detection becomes difficult.

An object of the invention is made in view of the aforementioned problem and a main object is to provide a touch panel controller capable of detecting a touch input by an object to be detected, which is at a position slightly away from a surface of a touch panel, more correctly.

Solution to Problem

In order to solve the aforementioned problem, a touch panel controller according to one aspect of the invention includes a capacitance driving unit which causes a linear sum signal based on charges, which are accumulated in a plurality of electrostatic capacitances arranged in a corresponding row, to be output from at least one sense line of a touch panel including a plurality of drive lines in which respective columns of a plurality of electrostatic capacitances arranged in a matrix manner are arranged and a plurality of sense lines in which respective rows of the plurality of electrostatic capacitances are arranged, by driving the plurality of drive lines in parallel; a driving signal generation unit which outputs each of a plurality of driving signals for driving the plurality of drive lines in parallel to the capacitance driving unit by using code sequences; and a correlation control unit which performs control to switch high and low of correlation of the code sequences according to a detection distance which is a distance between a surface of the touch panel and an object to be detected.

Effects of Invention

According to one aspect of the invention, an effect that a touch input by an object to be detected, which is at a position slightly away from a surface of a touch panel, is able to be detected more correctly is realized.

Other objects, features, and strengths of the invention will be made clear by the description below. Further, the advantages of the invention will be evident from the following explanation with reference to the accompanying drawings.

BRIEF DESCRIPTION OF DRAWINGS

Figure 13:
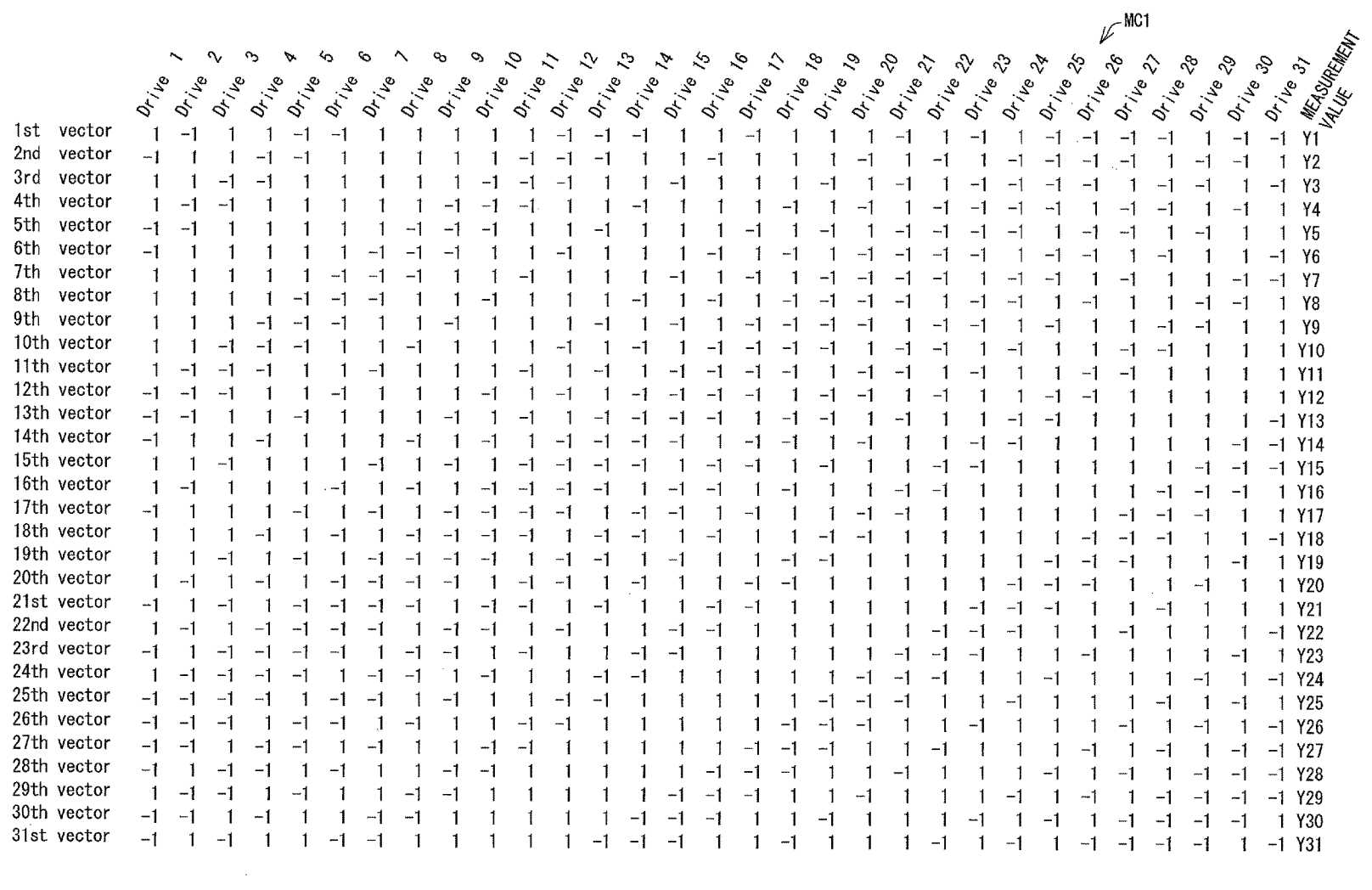

FIG. 13 is a view illustrating one example of code sequences (M-sequence codes).

FIG. 14 is a view illustrating a first half portion of one example of code sequences (Walsh codes).

FIG. 15 is a view illustrating a last half portion of the one example of the code sequences (Walsh codes).

FIG. 16 is a view illustrating one example of code sequences (Hadamard codes).

FIG. 17 is a view illustrating one example of code sequences (three-valued M-sequence codes).

DESCRIPTION OF EMBODIMENTS

Embodiments of the invention will be described based on FIG. 1 to FIG. 18 as follows. Here, configurations described in each of the embodiments below are not intended to limit the scope of the invention only to these unless otherwise specified, but are merely illustrative. Configurations other than configurations which are described in the specific embodiments below may be omitted from the description as needed, but are the same as configurations which are described in other embodiments. Further, for convenience of description, the same reference signs are assigned to members having the same functions as those of members indicated in each of the embodiments, and description thereof will be omitted as appropriate.

[About Change in Electrostatic Capacitances Between Touch Input and Sense Lines]

Figure 18:
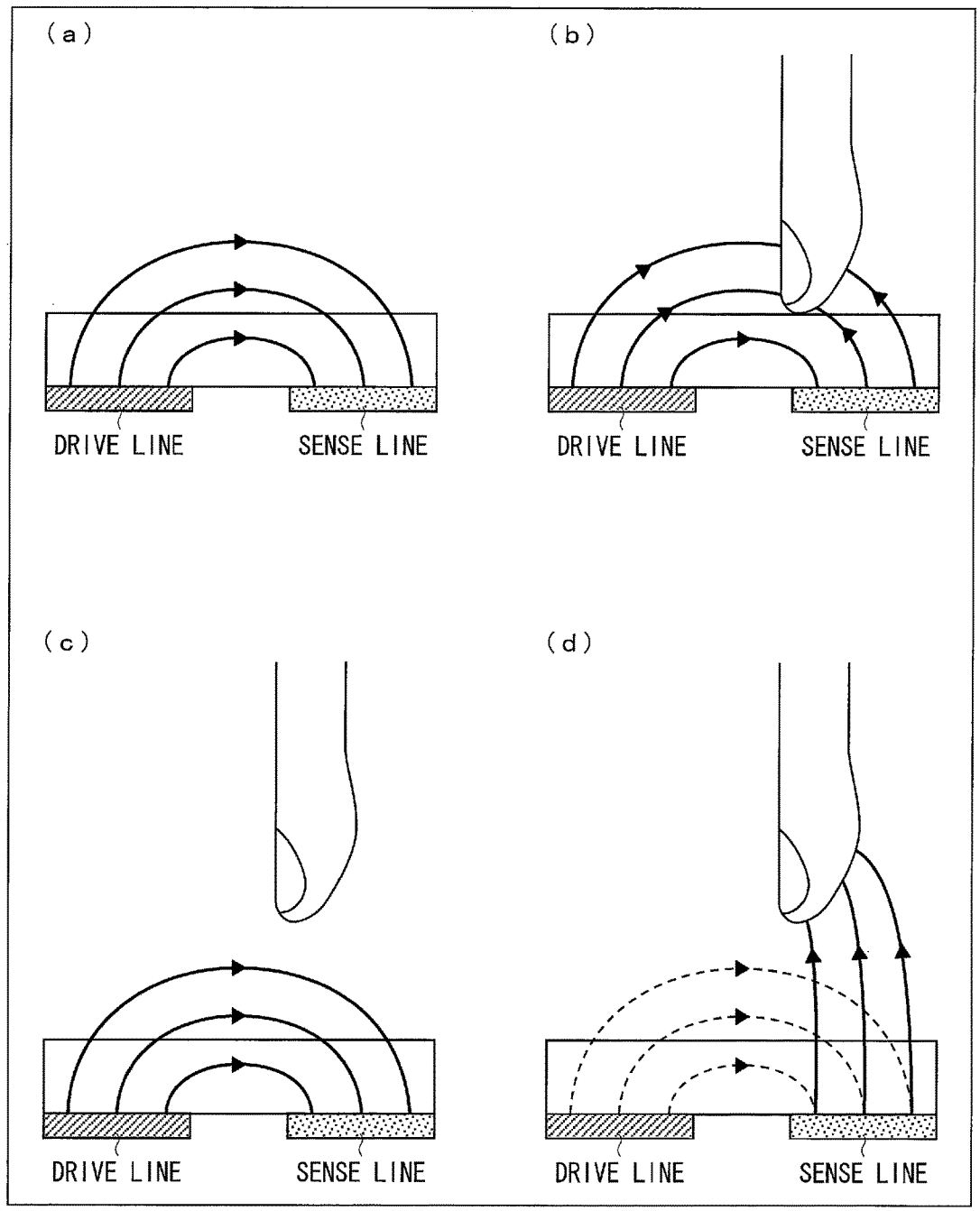
FIG. 18 is a schematic view for explaining a change in electrostatic capacitances between drive lines and sense lines, which is caused by a touch input, in which (a) illustrates a case where no touch input exists, (b) illustrates a case where an object to be detected is in contact with the surface of the touch panel, and (c) and (d) illustrate a case where an object to be detected, which is associated with the touch input, exists at a position away from the surface of the touch panel.
Figure 19:
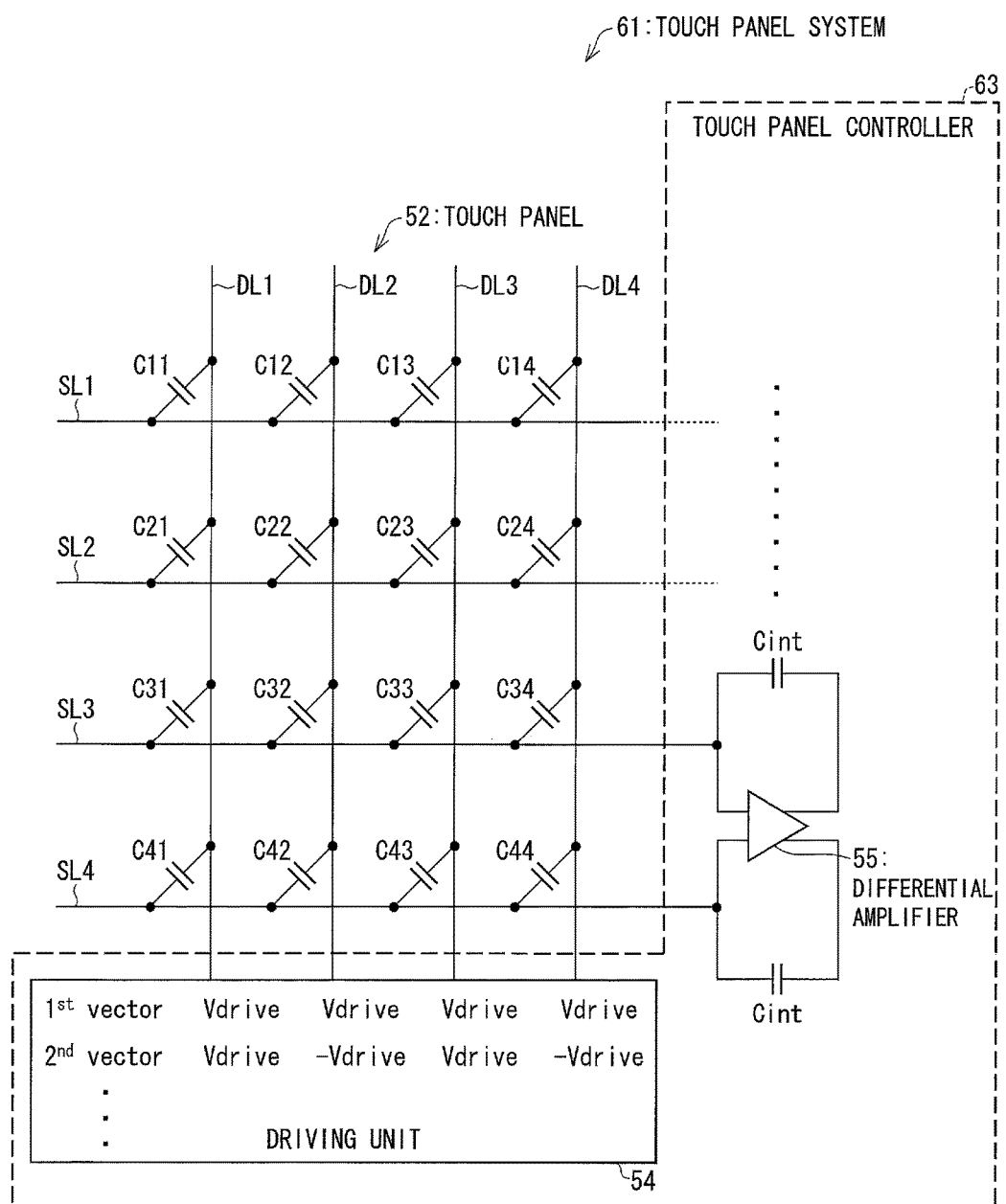
FIG. 19 is a schematic view illustrating a configuration of a conventional touch panel system.

First, a change in electrostatic capacitances between drive lines and sense lines, which is caused by a touch input, will be described based on FIG. 18. FIG. 18 is a schematic view for explaining a change in electrostatic capacitances between the drive lines and the sense lines, which is caused by a touch input. (a) of FIG. 18 illustrates a case where no touch input exists, (b) of FIG. 18 illustrates a case where there is a touch input by an object to be detected (for example, such as a finger or a pen point of a touch pen) on a surface of a touch panel, and (c) and (d) of FIG. 18 illustrate a case where the object to be detected, which is associated with the touch input, exists at a position away from the surface of the touch panel.

When the object to be detected exists at a position (slightly) away from the surface of the touch panel, the electrostatic capacitances between the sense lines and the drive lines become small and the touch input becomes difficult to be detected. For example, as illustrated in (b) of FIG. 18, when the object to be detected is in contact with the surface of the touch panel, lines of electric force between the sense lines and the drive lines are terminated by the object to be detected, so that a change is caused in the electrostatic capacitances. When the object to be detected becomes away from the surface of the touch panel as illustrated in (c) of FIG. 18, however, almost no change is provided to the lines of electric force between the sense lines and the drive lines, so that the change in the electrostatic capacitances becomes small.

On the other hand, even when the object to be detected is slightly away as illustrated in (d) of FIG. 18, a change in the electrostatic capacitances exists between the object to be detected and the sense lines. The present inventor has considered that by using the change in the electrostatic capacitances between the object to be detected and the sense lines, it is possible to realize detection of a touch input (object to be detected) which exists at a position slightly away from the surface of the touch panel. Each embodiment described below which embodies the invention was contrived based on a novel idea as described above.

Embodiment 1

A touch panel device (integrated circuit) 1a according to Embodiment 1 of the invention will be described below with reference to FIG. 1 to FIG. 5.

<Configuration of Touch Panel Device>

Figure 1:
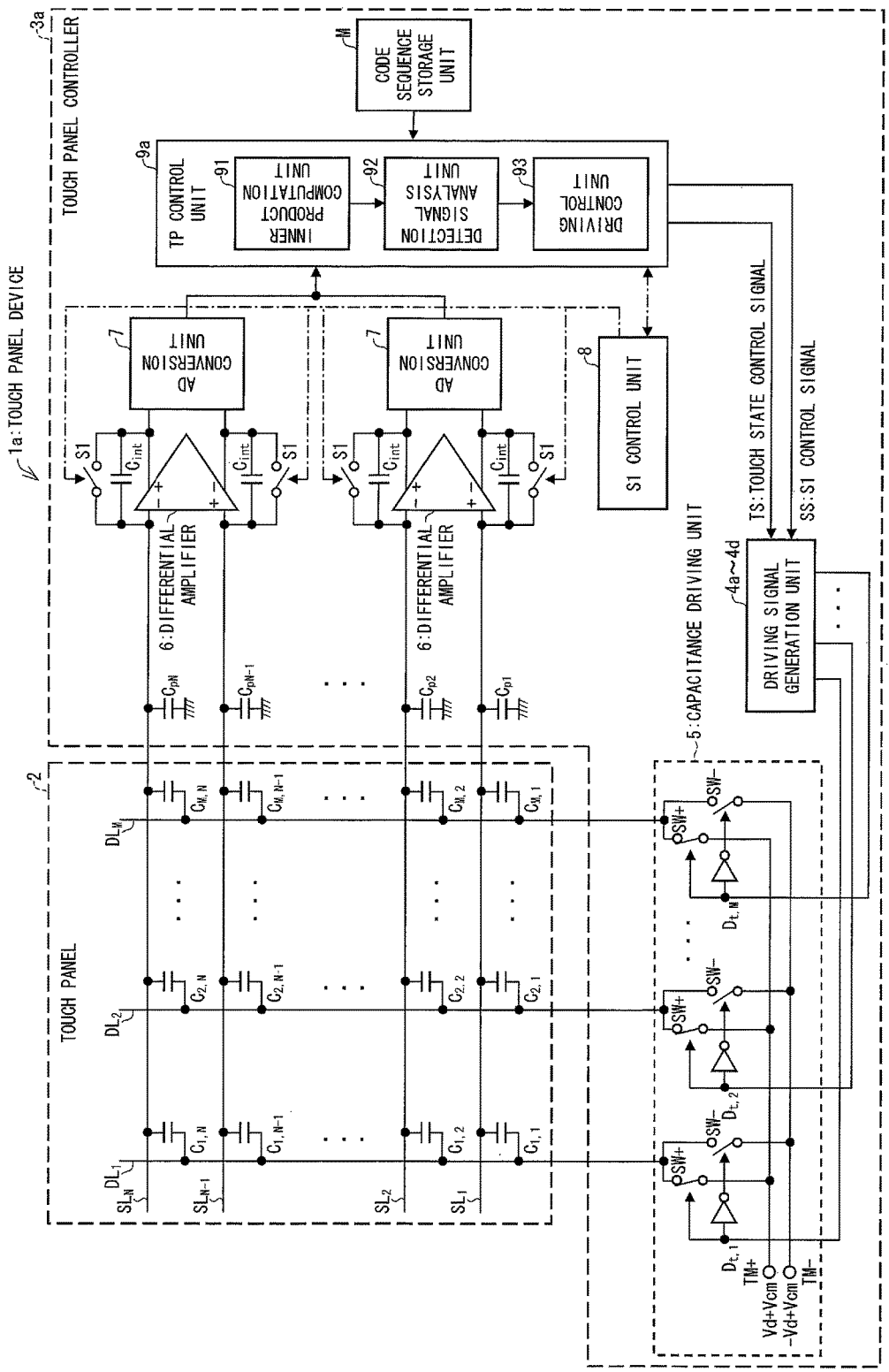
FIG. 1 is a circuit diagram illustrating a configuration of a touch panel device according to Embodiment 1 of the invention.

FIG. 1 illustrates a circuit diagram illustrating a configuration of the touch panel device 1a. As illustrated in the same figure, the touch panel device 1a includes a touch panel 2 and a touch panel controller 3a.

(Touch Panel 2)

The touch panel 2 has M (M is an integer of 2 or more) drive lines $DL_1$ to $DL_M$ and N (N is an integer of 2 or more) sense lines $SL_1$ to $SL_N$. Electrostatic capacitances $C_{1,1}$ to $C_{M,N}$ whose capacitance values of electrostatic capacitances are respectively $C_{1,1}$ to $C_{M,N}$ are arranged in a matrix manner at positions where the drive lines $DL_1$ to $DL_M$ and the sense lines $SL_1$ to $SL_N$ intersect with each other. Note that, in the followings, electrostatic capacitances $C_{1,X}$ to $C_{M,X}$ (X=1 to N) correspond to electrostatic capacitances (capacitance array) arranged in a row X in a plurality of electrostatic capacitances arranged in a matrix manner. Electrostatic capacitances $C_{Y,1}$ to $C_{Y,N}$ (Y=1 to M) correspond to electrostatic capacitances (capacitance array) arranged in a row Y in the plurality of electrostatic capacitances arranged in a matrix manner.

(Touch Panel Controller 3a)

As illustrated in FIG. 1, the touch panel controller 3a includes driving signal generation units 4a to 4d, a capacitance driving unit 5, differential amplifiers 6, AD conversion units 7, an S1 control unit 8, and a TP (touch panel) control unit 9a. Note that, a code sequence storage unit M illustrated in FIG. 1 may not be necessarily included in the touch panel controller 3a, but is indicated in the following explanation and therefore included in a configuration of the touch panel controller 3a for convenience of the explanation in FIG. 1. Further, on an output terminal side of each sense line $SL_X$ (X=1 to N), from a left side to a right side in a direction along the lines (hereinafter, referred to as a "sense line direction"), a ground capacitance $C_{px}$, the differential amplifier 6 and the AD conversion unit 7 are connected in this order. Further, between an input terminal and an output terminal of each of the differential amplifiers 6, an electrostatic capacitance $C_{int}$ and a switch which is controlled to be opened or closed with a control signal S1 are connected in parallel.

(Differential Amplifier 6, AD Conversion Unit 7)

An output signal of the differential amplifier 6 is converted into a digital signal by the AD conversion unit 7 and then subjected to inner product computation processing at the TP control unit 9a, so that capacitance values of the respective M electrostatic capacitances $C_{1,X}$ to $C_{M,X}$ which are arranged in a row X of the sense line SLx are estimated.

(S1 Control Unit 8)

With each of the control signal S1 and a control signal −S1 (hereinafter, these control signals are collectively referred to as an S1 control signal SS), the S1 control unit 8 controls opening and closing of each of switches in a vicinity of which "S1" and "−S1" are displayed. Note that, hereinafter, it is set that when the switch in a vicinity of which "S1" is described is opened, the switch in a vicinity of which "−S1" is described is closed, and when the switch on which "S1" is described is closed to the contrary, the switch on which "−S1" is described is opened. That is, the control signal S1 and the control signal −S1 have a mutually inverted relation.

(TP Control Unit 9a)

The TP control unit 9a of the present embodiment includes an inner product computation unit 91, a detection signal analysis unit (distance deciding unit) 92, a driving control unit (correlation control unit) 93.

With inner product computation of a linear sum signal which is output from at least one sense line $SL_X$ in the touch panel 2 and based on (derived from) charges accumulated in each of a plurality of electrostatic capacitances arranged in a corresponding row X, and code sequences described below, the inner product computation unit 91 estimates respective capacitance values of the plurality of electrostatic capacitances arranged in the corresponding row X of the sense line $SL_X$.

(Detection Signal Analysis Unit 92 and Driving Control Unit 93)

The detection signal analysis unit 92 uses the respective capacitance values of the plurality of electrostatic capacitances, which are estimated by the inner product computation unit 91, to decide whether or not a detection distance which is a distance between a surface of the touch panel 2 and an object to be detected is longer than a predetermined threshold. Here, the "predetermined threshold" is a threshold which is set for discriminating "a case where a touch input is in contact with the touch panel surface or not in contact therewith but has a sufficiently short distance therefrom" and "a case where the touch input is away from the touch panel surface". Further, the driving control unit 93 performs control for switching high and low of correlation of code sequences output by the driving signal generation units 4a to 4d, according to a decision result as to whether or not the detection distance is longer than the threshold, which is decided by the detection signal analysis unit 92. More specifically, when the detection distance is the threshold or less, the driving control unit 93 causes the driving signal generation units 4a to 4d to output low-correlation code sequences which mutually have low correlation, as the aforementioned code sequences. On the other hand, when the detection distance is longer than the threshold, the driving control unit 93 causes the driving signal generation units 4a to 4d to output high-correlation code sequences which mutually have a high correlation compared to the low-correlation code sequences, as the aforementioned code sequences.

A touch signal detected on the touch panel 2 (=the respective estimated capacitance values of the M electrostatic capacitances $C_{1,X}$ to $C_{M,X}$) has a narrow signal range and has a high signal level when a detection distance is short (when a distance between the surface of the touch panel and the object to be detected is close). On the other hand, when the detection distance is long (when the distance between the surface of the touch panel and the object to be detected is far), the signal range tends to be wide and the signal level tends to be low. Thus, for example, by checking an association relation between the detection distance and the touch signal in advance by using the tendency as described above, it becomes possible to decide whether or not the detection distance is longer than the threshold.

(Driving Signal Generation Units 4a to 4d and Capacitance Driving Unit 5)

The driving signal generation units 4a to 4d output each of a plurality of driving signals for driving the M drive lines $DL_1$ to $DL_M$ in parallel to the capacitance driving unit 5 by using code sequences (or mutually same signals) described below. The capacitance driving unit 5 drives the M drive lines $DL_1$ to $DL_M$ in parallel to cause a linear sum signal based on charges accumulated in each of the M electrostatic capacitances $C_{1,X}$ to $C_{M,X}$ arranged in a corresponding row X to be output from at least one sense line $SL_X$ in the touch panel 2. To a terminal TM+ and a terminal TM− of the capacitance driving unit 5, Vd+Vcm and −Vd+Vcm are respectively applied. Moreover, when switches SW+ are closed and switches SW− are opened in the capacitance driving unit 5, Vd+Vcm is applied to each of the drive liens $DL_1$ to $DL_M$. On the other hand, when the switches SW+ are opened and the switches SW− are closed in the capacitance driving unit 5, −Vd+Vcm is applied to each of the drive liens $DL_1$ to $DL_M$.

Next, more specific operations of the driving signal generation units 4a to 4d and the capacitance driving unit 5 will be described. In the touch panel device 1a of the present embodiment, any of the plurality of electrostatic capacitors $C_{M,N}$ is driven by the capacitance driving unit 5 which is connected to the drive lines $DL_1$ to $DL_M$. Code sequences $D_1$ to $D_M$ are provided from the driving signal generation units 4a to 4d to the capacitance driving unit 5. The capacitance driving unit 5 applies a voltage Vd+Vcm to a corresponding drive line when a code of the code sequences is "1" and applies a voltage −Vd+Vcm to a corresponding drive line when the code is "−1". Here, Vcm is a voltage serving as a reference of a driving voltage.

Figure 14:
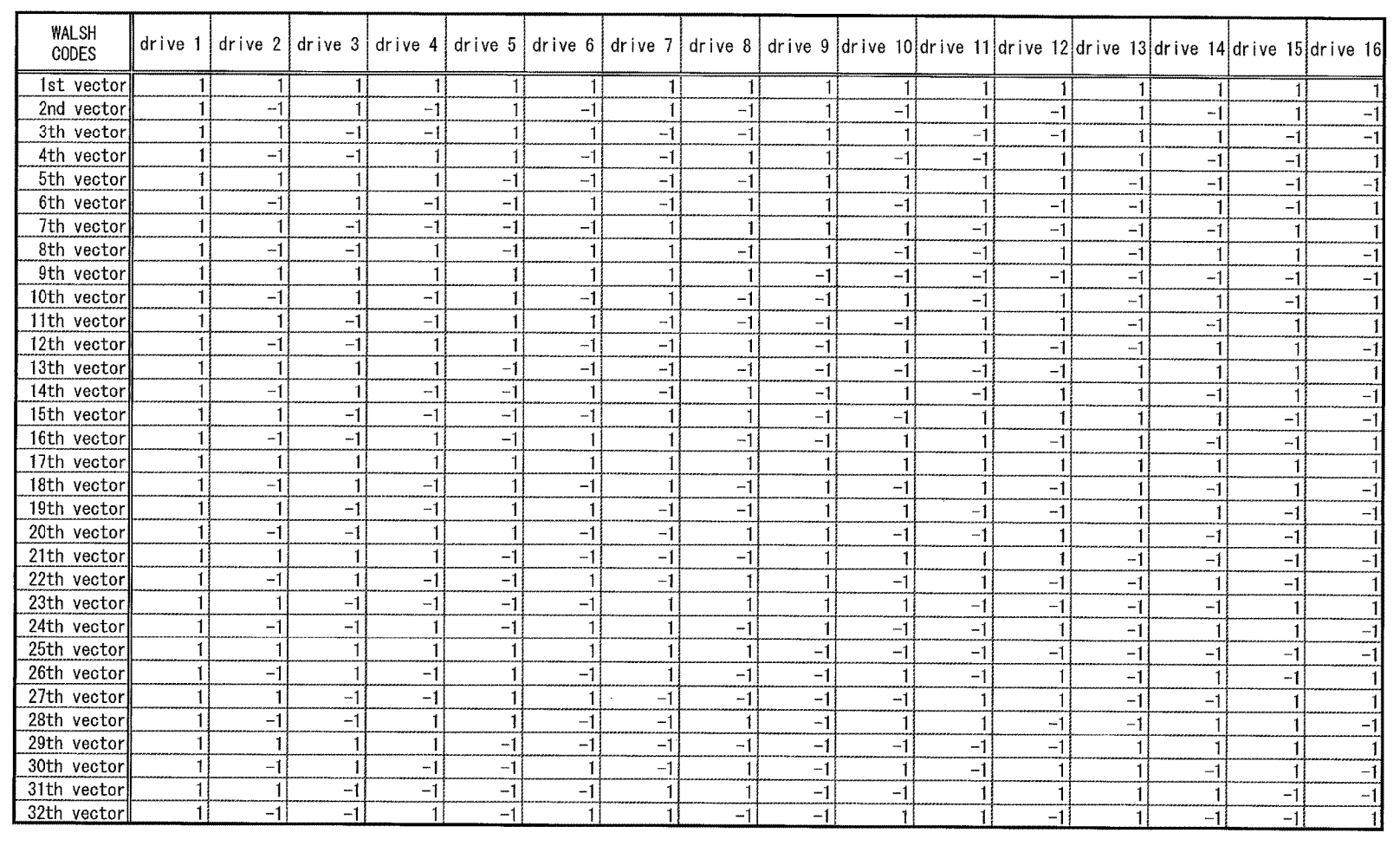
Figure 15:
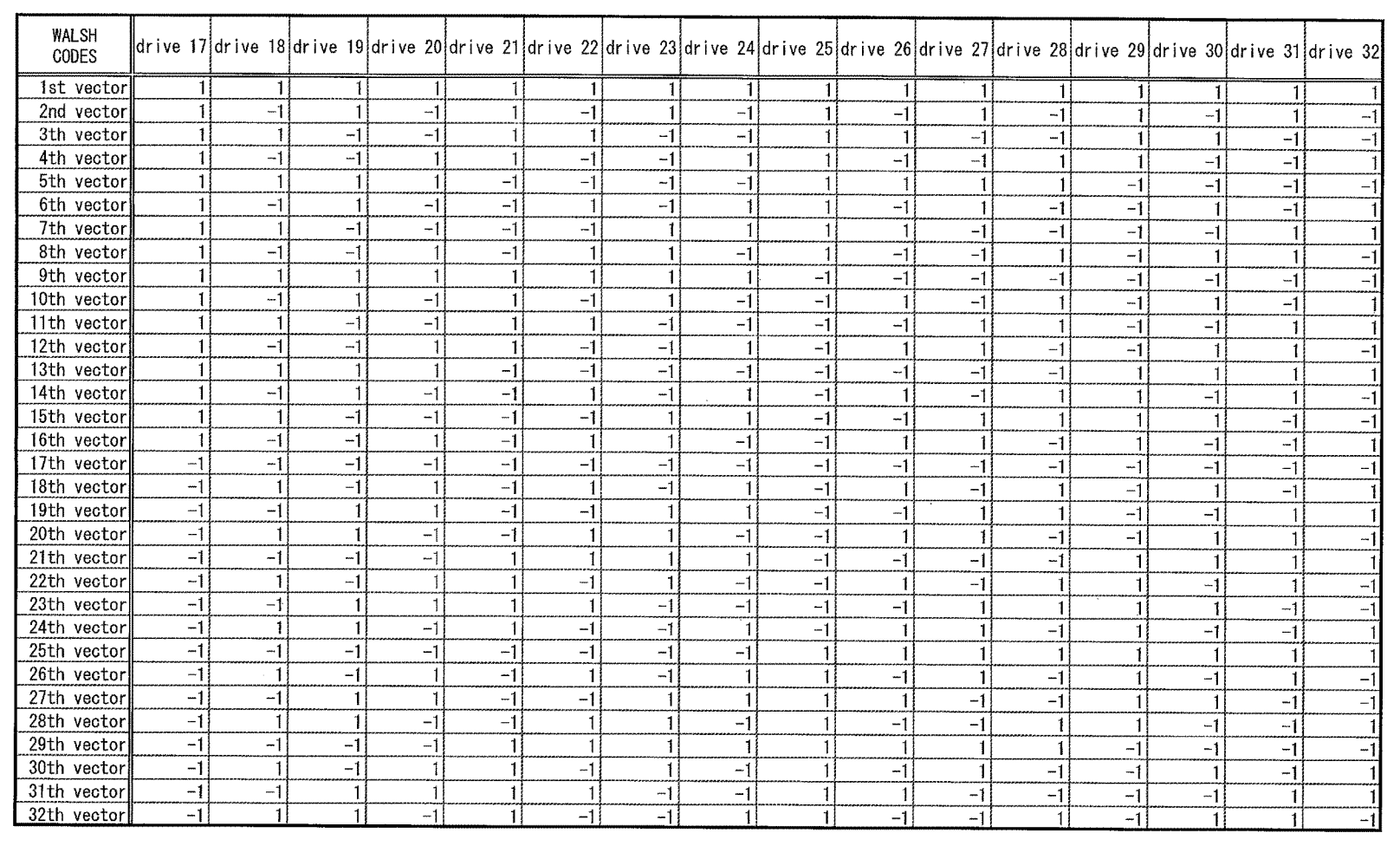
Figure 16:
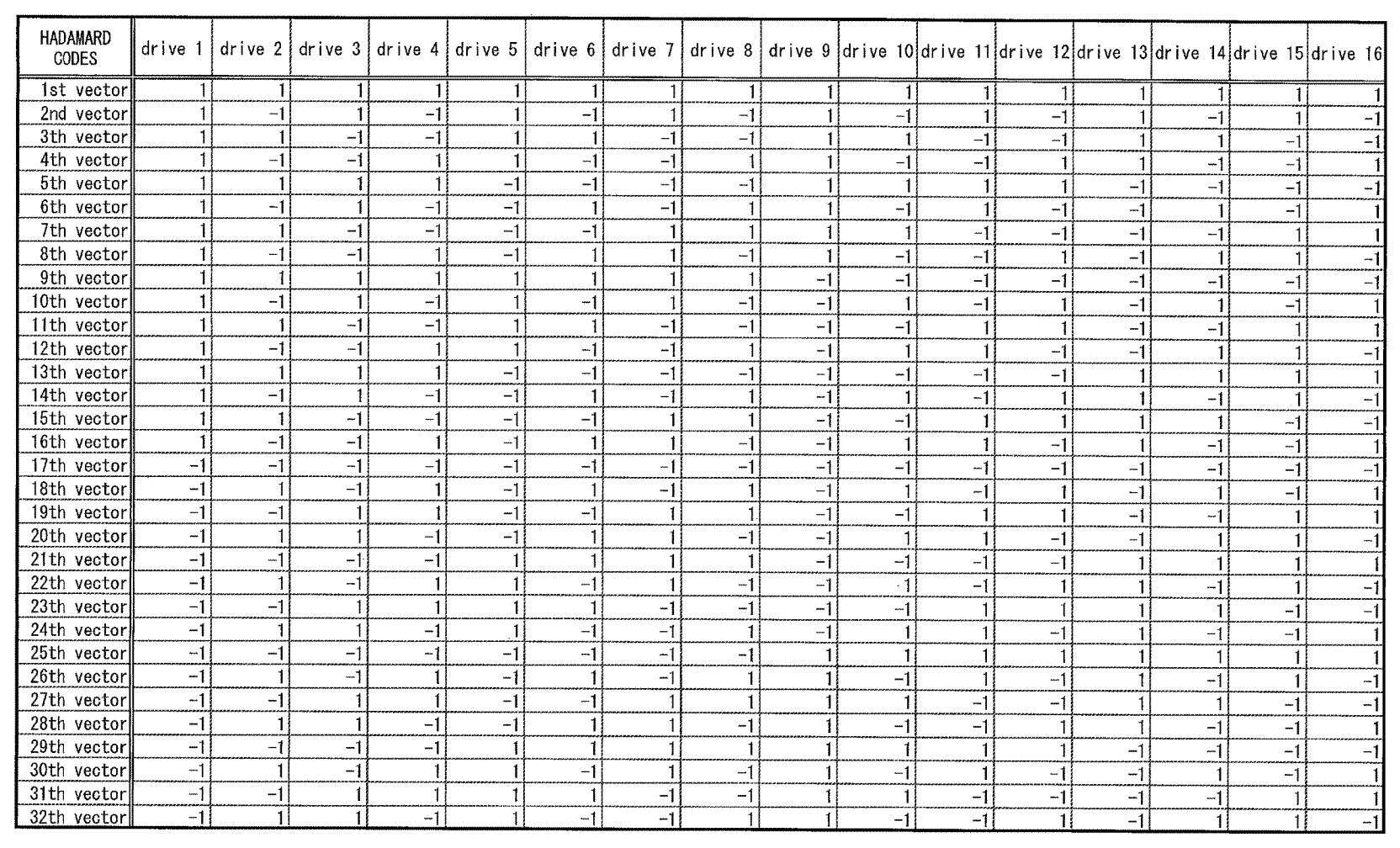

Next, an operation of each of the driving signal generation units 4a to 4d will be described based on FIGS. 2 to 5. In a case where a touch state where the object to be detected is in contact with the surface of the touch panel 2 or not in contact therewith but has a sufficiently short distance therefrom is detected (when the detection distance is the threshold or less), code sequences which are mutually different are applied to the capacitance driving unit 5. For the code sequences, it is desired to use code sequences which mutually have low correlation (hereinafter, referred to as "low-correlation code sequences" as appropriate), such as M-sequences, Hadamard sequences and Walsh sequences. For example, one example of the Walsh sequences (Walsh codes) is illustrated in FIG. 14 and FIG. 15. Note that, in these figures, the one example of the Walsh sequences is illustrated being separated into two figures of FIG. 14 and FIG. 15 as a first half portion and a last half portion, respectively, for convenience. That is, FIG. 14 illustrates code sequences of drive lines $DL_1$ to $DL_{16}$ and FIG. 15 illustrates code sequences of drive lines $DL_{17}$ to $DL_{32}$. In addition, FIG. 16 illustrates one example of Hadamard sequences (Hadamard codes). FIG. 17 illustrates one example of three-valued M-sequences. Note that, as illustrated in the examples, a code sequence which is applicable to the invention is not limited to a binary code sequence. That is, it is also possible to use a code sequence of multiple values of three or more.

More specifically, when a distance between the surface of the touch panel 2 and the object to be detected (detection distance) is a predetermined threshold or less, the driving control unit 93 of the TP control unit 9a performs control to cause the driving signal generation units 4a to 4d to output low-correlation code sequences.

On the other hand, in a case where a touch state where the object to be detected is slightly away from the surface of the touch panel 2 is detected, code sequences which mutually have high correlation compared to the low-correlation code sequences (hereinafter, referred to as "high-correlation code sequences" as appropriate) are provided as the code sequences to be provided to the capacitance driving unit 5.

More specifically, when the detection distance is longer than the threshold, the driving control unit 93 of the TP control unit 9a performs control to cause the driving signal generation units 4a to 4d to output the high-correlation code sequences.

Note that, as a simpler example of the high-correlation code sequences, for example, by providing the same code sequences (the same signals) to all the drive lines $DL_1$ to $DL_M$, the code sequences having high correlation are able to be provided.

Next, some configuration examples of the driving signal generation units are illustrated based on FIGS. 2 to 5. Though an example of a case where M-sequences using a linear feedback shift register are used as code sequences (hereinafter, referred to as M-sequence codes) is indicated here, an embodiment of the invention is not limited to such a mode. For example, other code sequences which are orthogonal to each other may be used as code sequences.

The driving signal generation units 4a to 4d include at least a linear feedback shift register (41) for outputting M-sequence codes and a plurality of shift registers 42 (1 to M) each provided correspondingly to each of the plurality of drive lines $DL_1$ to $DL_M$. Each of the driving signal generation units 4a to 4d bit-shifts the M-sequence codes output from the linear feedback shift register 41 by each of the plurality of shift registers 42 (1 to M) to thereby output M types of low-correlation code signals.

On the other hand, each of the driving signal generation units 4a to 4d provides each of the plurality of drive lines $DL_1$ to $DL_M$ with signals, which are mutually the same, as the plurality of driving signals described above to thereby increase correlation between the code sequences and output high-correlation code sequences. This makes it possible to switch high and low of the correlation of the code sequences with a simple configuration.

Figure 2:
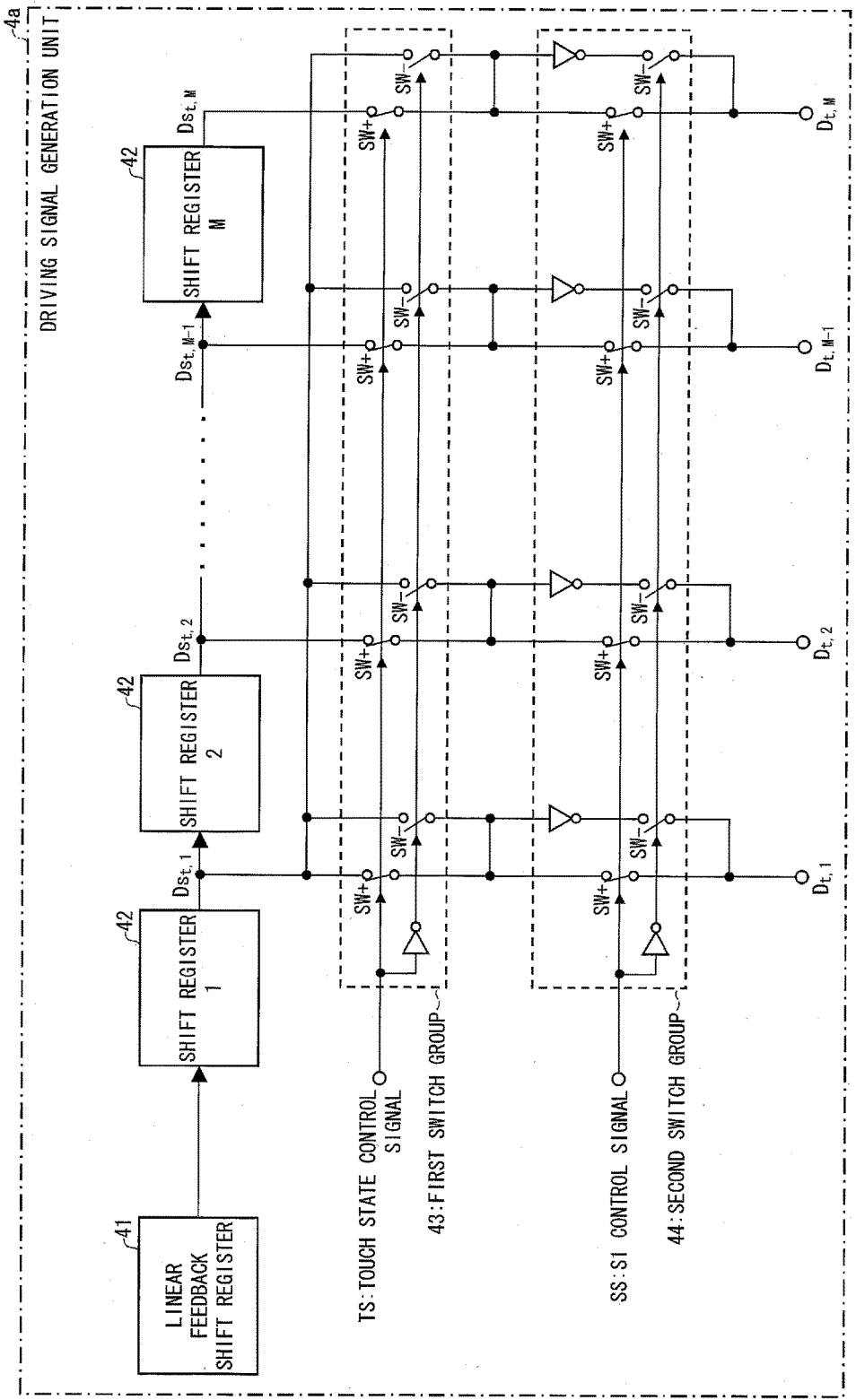
FIG. 2 is a circuit diagram illustrating one configuration example of a driving signal generation unit, with respect to the touch panel device.

The driving signal generation unit 4a illustrated in FIG. 2 bit-shifts M-sequences obtained from the linear feedback shift register 41 by the shift registers 42 (1 to M) and generates code sequences which mutually have low correlation.

The driving signal generation unit 4a includes a first switch group 43 which operates in response to a touch state control signal TS, and the first switch group 43 switches, in response to the state control signal TS, a case where output signals of the respective shift registers 42 (1 to M) are output and a state where all the output signals become the output signal of the shift register 1.

Note that, though an example that code sequences output by the shift register 1 are commonly provided to all the drive lines $DL_1$ to $DL_M$ is indicated as an example of high-correlation code sequences in the present embodiment, an embodiment of the invention is not limited thereto. For example, code sequences output by any one shift register which is selected from among the shift registers 42 (1 to M) may be commonly provided to all the drive lines $DL_1$ to $DL_M$. That is, in the driving signal generation unit 4a, when a detection distance is the predetermined threshold or less (when a touch input is in contact with the surface of the touch panel, or not in contact therewith but has a sufficiently short distance therefrom), the first switch group 43 outputs the output signal of each of the shift registers 42 (1 to M) in response to the control signal. On the other hand, when the detection distance is longer than the threshold (when the touch input is away from the touch panel surface), all the output signals become the same as the output signal of the shift register 1.

Further, the driving signal generation unit 4a includes a second switch group 44 which is controlled with the same signal as the S1 control signal SS which is installed in the differential amplifiers 6 illustrated in FIG. 1. When the switches SW+ controlled with the control signal S1 are turned ON (the switches SW− are turned OFF), the second switch group 44 provides each of the drive lines $DL_1$ to $DL_M$ with the outputs of the first switch group 43 directly. On the other hand, when the switches SW+ controlled with the control signal S1 are turned OFF (the switches SW− are turned ON), the second switch group 44 provides each of the drive lines $DL_1$ to $DL_M$ with a signal obtained by inverting the output signal of the first switch group 43. Use of the driving signal generation unit 4a which operates in this manner makes it possible to estimate capacitances as indicated in a formula (3) described below.

Figure 3:
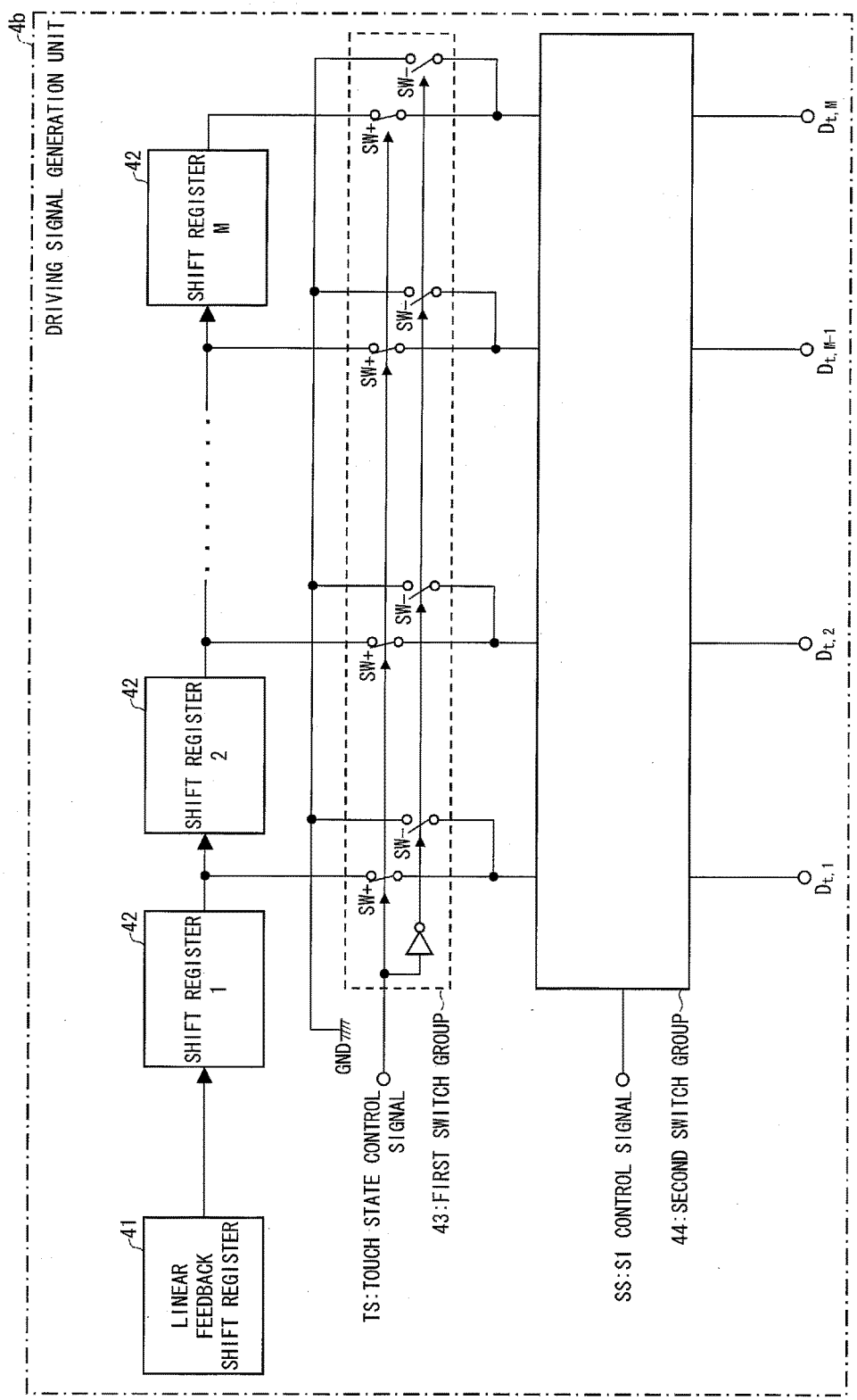
FIG. 3 is a circuit diagram illustrating another configuration example of the driving signal generation unit.

Next, when the object to be detected is away from the surface of the touch panel (when the detection distance is longer than the predetermined threshold), like the driving control signal generation unit 4b illustrated in FIG. 3, control may be performed so that a fixed signal (same signal) is provided. In the present embodiment, an example that GND (ground potential) is used as such a fixed signal is indicated.

Figure 4:
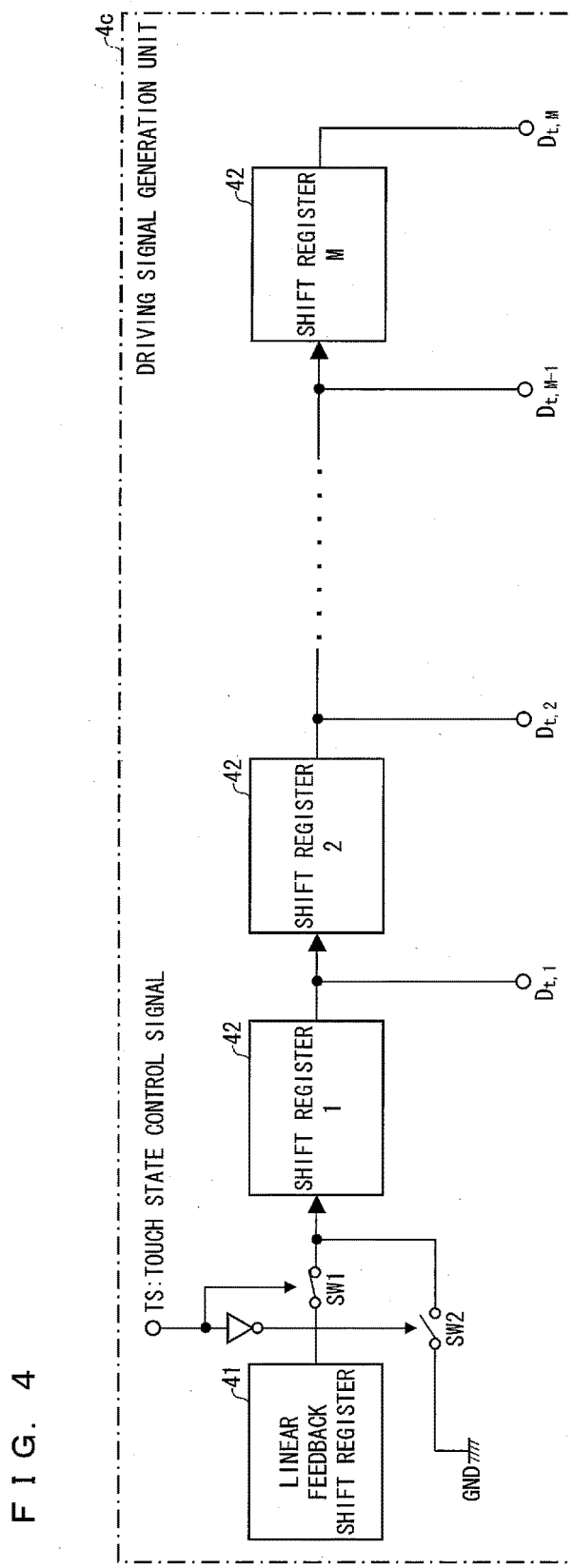
FIG. 4 is a circuit diagram illustrating still another configuration example of the driving signal generation unit.

Next, when the touch input is away from the surface of the touch panel, like the driving signal generation unit 4c illustrated in FIG. 4, control may be performed so that a signal input to the shift register 1 becomes a fixed signal. An example that GND is used as the fixed signal is indicated in FIG. 4. More specifically, when the detection distance is the threshold or less, a switch SW1 is closed and a switch SW2 is opened. Thereby, the M-sequence codes from the linear feedback shift register 41 are supplied to each of the shift registers 42 (1 to M) and the low-correlation code sequences are provided to each of the drive lines $DL_1$ to $DL_M$. On the other hand, when the detection distance is longer than the threshold, the switch SW1 is opened and the switch SW2 is closed. Thereby, a signal input to the shift register 1 becomes a fixed signal (GND). Thus, the same fixed signal is supplied to each of the shift registers 42 (1 to M) and the high-correlation code sequences are provided to each of the drive lines $DL_1$ to $DL_M$.

Figure 5:
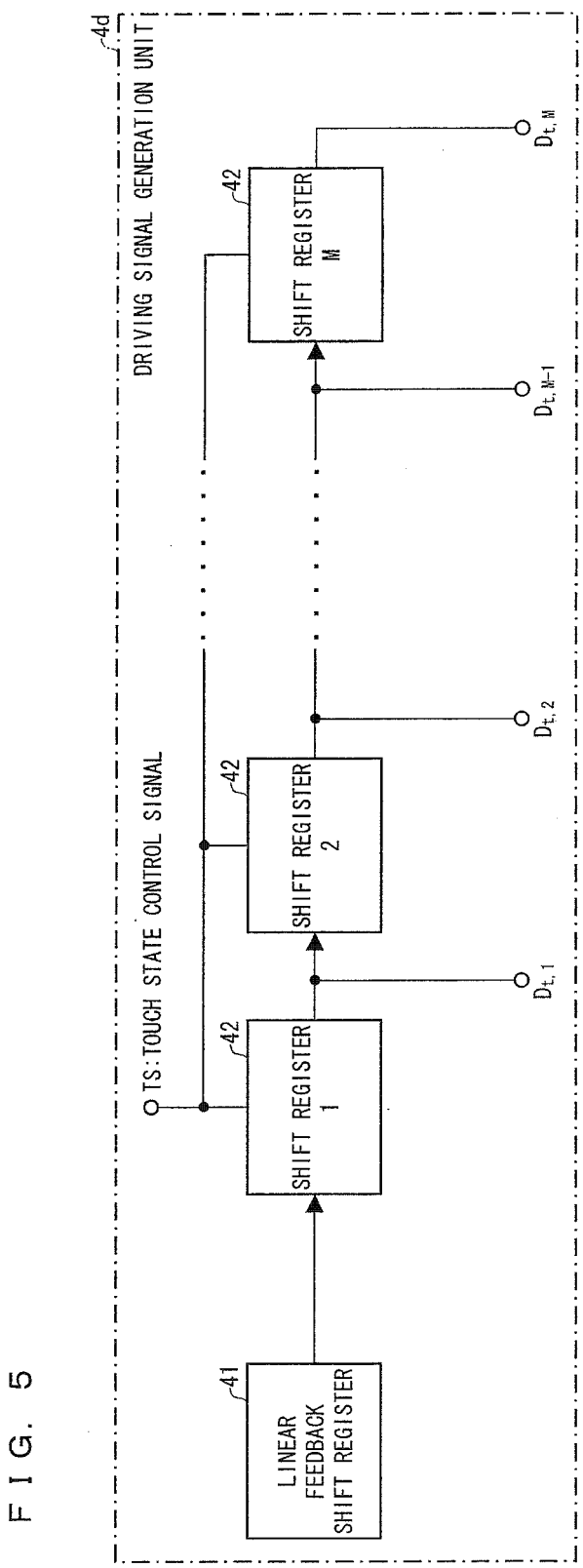
FIG. 5 is a circuit diagram illustrating still another configuration example of the driving signal generation unit.

Next, when the touch input is away from the surface of the touch panel (when the detection distance is the threshold or more), like the driving signal generation unit 4d illustrated in FIG. 5, the same signal may be provided to all the drive lines $DL_1$ to $DL_M$ by resetting all the shift registers 42 (1 to M). Note that, since components subsequent to the first switch group 43 (particularly, the second switch group 44) are similar to the case of FIG. 2, the second switch group 44 is illustrated as a black box in FIG. 3 and is completely omitted in FIG. 4 and FIG. 5. Though the linear feedback shift register is used as a code generation unit for outputting sequence codes in the modes illustrated in FIGS. 2 to 5, the code sequences may be generated by a different method.

Further, the driving signal generation unit may control the code generation unit, which generates the code sequences, with the touch state control signal TS, and, for example, when the touch input is away from the surface of the touch panel, code sequences (or signals) in which all become "1" or "−1" may be output.

In the present embodiment, a fully-differential amplifier is used as the differential amplifier 6 and sense lines which are adjacent to each other are connected to input and output sides of the differential amplifier 6. However, the differential amplifier 6 does not need to be the fully-differential amplifier and sense lines which are adjacent to each other are not necessarily connected through the differential amplifier 6.

(Code Sequence Storage Unit M)

In each of the modes illustrated in FIGS. 2 to 5 described above, an example that, as means for generating code sequences, the linear feedback shift register 41 and the shift registers 42 (1 to M) which are arranged correspondingly to each of the plurality of drive lines $DL_1$ to $DL_M$ is indicated, but modes for realizing the invention are not limited thereto. For example, it may be such that data about code sequences is stored in advance in the code sequence storage unit M, and the driving control unit 93 of the TP control unit 9a sequentially reads the code sequences recorded in the code sequence storage unit M to supply to the capacitance driving unit 5 through driving signal generation units. Note that, when the aforementioned driving signal generation units 4a to 4d are used as the driving signal generation units, the code sequence storage unit M does not need to be particularly provided. That is, when the code sequence storage unit M is not provided, a memory capacity is able to be saved for that amount and a circuit configuration is able to be simplified.

<Working Effect of Touch Panel Device 1a>

Next, a working effect of the touch panel device 1a will be described in detail by using FIG. 10.

Figure 10:
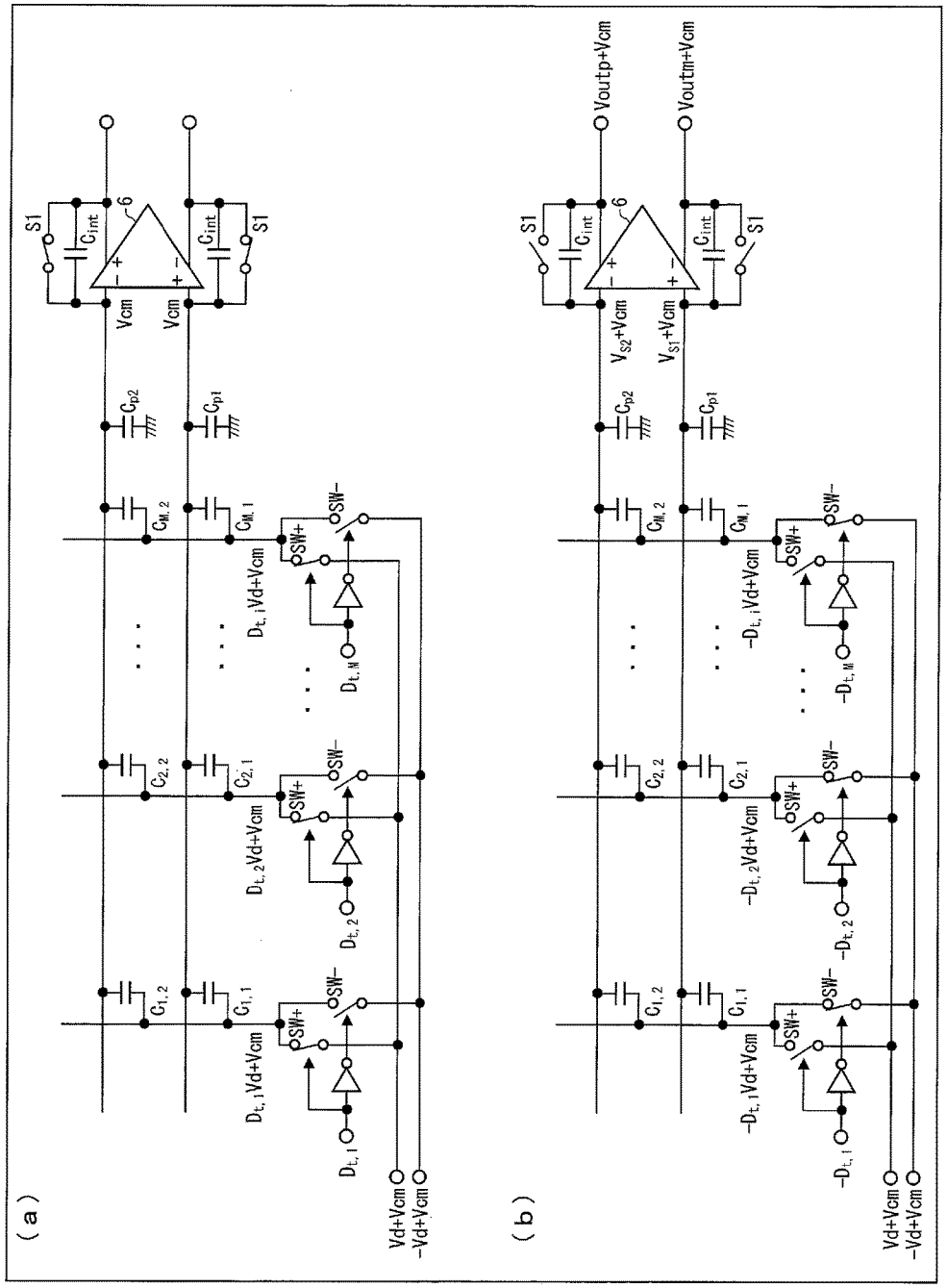
FIG. 10 is a circuit diagram for explaining an operation of the touch panel device according to Embodiment 1 above, in which (a) illustrates a state where switches to be controlled with a control signal S1 are closed and (b) illustrates a state where the switches to be controlled with the control signal S1 are opened.

First, as illustrated in (a) of FIG. 10, when switches which are controlled with the control signal S1 of each of the differential amplifiers 6 are turned ON, a voltage of each of two sense lines in upper and lower sides with respect to a direction along the drive lines (drive line direction) becomes Vcm. In this case, to each of the drive lines $DL_1$ to $DL_M$, Vd+Vcm is provided when the code sequence provided to each of them is "1" and −Vd+Vcm is provided when it is "−1". Accordingly, charges Q1a and Q2a which are accumulated in capacitances connected to each of the two upper and lower sense lines are provided by

[Expression 6]

$$\begin{cases} Q1a_t = -\sum_{i=1}^{M} D_{t,i} VdC_{i,1} + VcmC_{p1} \\ Q2a_t = -\sum_{i=1}^{M} D_{t,i} VdC_{i,2} + VcmC_{p2} \end{cases}$$

Here, $C_{p1}$ and $C_{p2}$ are electrostatic capacitances between each of the sense lines and the GND (ground potential).

Next, as illustrated in (b) of FIG. 10, when the switches which are controlled with the control signal S1 of each of the differential amplifiers 6 are turned OFF, signals obtained by inverting the signals provided when the switches which are controlled with the control signal S1 are turned ON are provided to the drive lines $DL_1$ to $DL_M$.

When voltages of the respective sense lines are Vs1+Vcm and Vs2+Vcm, charges Q1b and Q2b which are accumulated in capacitances connected to the respective sense lines are provided by

[Expression 7]

$$\begin{cases} Q1b_t = \sum_{i=1}^{M}(Vs1 + D_{t,i}Vd)C_{i,1} + \\ \qquad (Vs1 + Vcm)C_{p1} + (Vs1 - Voutm)C_{int} \\ Q2b_t = \sum_{i=1}^{M}(Vs2 + D_{t,i}Vd)C_{i,2} + \\ \qquad (Vs2 + Vcm)C_{p2} + (Vs2 - Voutp)C_{int} \end{cases}$$

Here, since $Q1a_t = Q1b_t$ and $Q2a_t = Q2b_t$ are respectively established,

[Expression 8]

$$\begin{cases} -\sum_{i=1}^{M} D_{t,i} VdC_{i,1} + VcmC_{p1} = \begin{array}{l}\sum_{i=1}^{M}(Vs1_t + D_{t,i}Vd)C_{i,1} + \\ (Vs1_t + Vcm)C_{p1} + \\ (Vs1_t + Voutm_t)C_{int}\end{array} \\ -\sum_{i=1}^{M} D_{t,i} VdC_{i,2} + VcmC_{p2} = \begin{array}{l}\sum_{i=1}^{M}(Vs2_t + D_{t,i}Vd)C_{i,2} + \\ (Vs2_t + Vcm)C_{p2} + \\ (Vs2_t + Voutp_t)C_{int}\end{array} \end{cases}$$

This formula is modified as follows:

[Expression 9]

$$\begin{cases} Voutm_t C_{int} - 2\sum_{i=1}^{m} D_{t,i} VdC_{i,1} = \left(\sum_{i=1}^{M} C_{i,1} + C_{p1} + C_{int}\right)Vs1_t \\ Voutp_t C_{int} - 2\sum_{i=1}^{m} D_{t,i} VdC_{i,2} = \left(\sum_{i=1}^{M} C_{i,2} + C_{p2} + C_{int}\right)Vs2_t \end{cases}$$

[Expression 10]

$$\frac{\left(Voutp_t C_{int} - 2\sum_{i=1}^{M} D_{t,i} VdC_{i,2}\right)}{\left(\sum_{i=1}^{M} C_{i,2} + C_{p2} + C_{int}\right)} - \frac{\left(Voutp_t C_{int} - 2\sum_{i=1}^{M} D_{t,i} VdC_{i,1}\right)}{\left(\sum_{i=1}^{M} C_{i,1} + C_{p1} + C_{int}\right)} =$$

$$Vs2_t - Vs1_t \sim 0$$

[Expression 11]

$$Voutp_t C_{int} \left(\frac{1}{\left(\sum_{i=1}^{M} C_{i,2} + C_{p,2} + C_{int}\right)} + \frac{1}{\left(\sum_{i=1}^{M} C_{i,1} + C_{p,1} + C_{int}\right)}\right) -$$

$$\frac{2\sum_{i=1}^{M} D_{t,i} VdC_{i,2}}{\left(\sum_{i=1}^{M} C_{i,2} + C_{p2} + C_{int}\right)} + \frac{2\sum_{i=1}^{M} D_{t,i} VdC_{i,1}}{\left(\sum_{i=1}^{M} C_{i,2} + C_{p,2} + C_{int}\right)} = 0$$

[Expression 12]

$$Voutp_t C_{int} \left(\left(\sum_{i=1}^{M} C_{i,1} + C_{p1} + C_{int}\right) + \left(\sum_{i=1}^{M} C_{i,2} + C_{p2} + C_{int}\right)\right) =$$

$$2\left(\sum_{i=1}^{M} C_{i,1} + C_{p1} + C_{int}\right)\sum_{i=1}^{M} D_{t,i} VdC_{i,2} -$$

$$2\left(\sum_{i=1}^{M} C_{i,2} + C_{p2} + C_{int}\right)\sum_{i=1}^{M} D_{t,i} VdC_{i,1}$$

[Expression 13]

$$Voutp_t - \frac{2\left(\sum_{i=1}^{M} C_{i,1} + C_{p1} + C_{int}\right)\sum_{i=1}^{M} D_{t,i} VdC_{i,2} - 2\left(\sum_{i=1}^{M} C_{i,2} + C_{p2} + C_{int}\right)\sum_{i=1}^{M} D_{t,i} VdC_{i,1}}{C_{int}\left(\sum_{i=1}^{M} C_{i,1} + \sum_{i=1}^{M} C_{i,2} + C_{p1} + C_{p2} + 2C_{int}\right)}$$

[Expression 14]

$$Vout_t = Voutp_t -$$

$$Voutm_t = 4\frac{\left(\sum_{i=1}^{M} C_{i,1} + C_{p1} + C_{int}\right)\sum_{i=1}^{M} D_{t,i} VdC_{i,2} - \left(\sum_{i=1}^{M} C_{i,2} + C_{p2} + C_{int}\right)\sum_{i=1}^{M} D_{t,i} VdC_{i,1}}{C_{int}\left(\sum_{i=1}^{M} C_{i,1} + \sum_{i=1}^{M} C_{i,2} + C_{p1} + C_{p2} + 2C_{int}\right)}.$$

Here, when considering a case where the capacitances between the sense lines and the drive lines are uniform (=Cx), the output signal of the differential amplifier 6 is provided by

[Expression 15]

$$Vout_t = 4\frac{\left(\sum_{i=1}^{M} C_x + C_{p1} + C_{int}\right)\sum_{i=1}^{M} D_{t,i}VdC_x - \left(\sum_{i=1}^{M} C_x + C_{p2} + C_{int}\right)\sum_{i=1}^{M} D_{t,i}VdC_x}{C_{int}\left(\sum_{i=1}^{M} C_x + \sum_{i=1}^{M} C_x + C_{p1} + C_{p2} + 2C_{int}\right)}$$

[Expression 16]

$$Vout_t = 4C_xVd\sum_{i=1}^{M} D_{t,i}\frac{C_{p1} - C_{p2}}{C_{int}(2MC_x + C_{p1} + C_{p2} + 2C_{int})}.$$

Thus, an estimation value of a capacitance which is connected to a certain drive line K when the output signal of the differential amplifier 6 is provided as described above becomes

[Expression 17]

$$\sum_{t=1}^{N} Vout_t D_{t,K} - \sum_{t=1}^{N}\left(4C_xVd\sum_{i=1}^{M} D_{t,i}\frac{C_{p1} - C_{p2}}{C_{int}(2MC_x + C_{p1} + C_{p2} + 2C_{int})}\right)D_{t,K}.$$

Here, when orthogonal code sequences (for example, refer to PTL 1) are used for driving of the drive lines as described in PTL 1,

[Expression 18]

$$\sum_{t=1}^{N}\left(4C_xVd\sum_{i=1}^{M} D_{t,i}\frac{C_{p1} - C_{p2}}{C_{int}(2MC_x + C_{p1} + C_{p2} + 2C_{int})}\right)D_{t,K} = 4NC_xVd\frac{C_{p1} - C_{p2}}{C_{int}(2MC_x + C_{p1} + C_{p2} + 2C_{int})}.$$

When capacitance values estimated for the respective M drive lines are added,

[Expression 19]

$$4NMC_xVd\frac{C_{p1} - C_{p2}}{C_{int}(2MC_x + C_{p1} + C_{p2} + 2C_{int})} \quad \text{formula (1)}$$

is provided.

Here, considered is a case where a noise Vn is included in the output signal of the differential amplifier 6. An estimation value in this case is provided by

[Expression 20]

$$\sum_{t=1}^{N}(Vout_t + Vn_t)D_{t,K} = 4NC_xVd\frac{C_{p1} - C_{p2}}{C_{int}(2MC_x + C_{p1} + C_{p2} + 2C_{int})} + \sum_{t=1}^{N} Vn_t D_{t,K}.$$

When the capacitance values estimated for the respective M drive lines $DL_1$ to $DL_M$ are added in order to reduce influence of the noise,

[Expression 21]

$$4NMC_xVd\frac{C_{p1} - C_{p2}}{C_{int}(2MC_x + C_{p1} + C_{p2} + 2C_{int})} + \sum_{i=1}^{M}\sum_{t=1}^{N} Vn_t D_{t,i}$$

is provided.

It is assumed that an object to be detected, which is associated with a touch input, is at a position away from the surface of the touch panel, the potential of the touch input is GND, the capacitance between one of the sense lines and the GND changes by $\Delta C$, and $C_{p1}=C_{p2}=C_p \gg \Delta C$. In this case, the estimation value is provided as

[Expression 22]

$$2NMC_xVd\frac{\Delta C}{C_{int}(MC_x + C_p + C_{int})} I\sum_{i=1}^{M}\sum_{t=1}^{N} Vn_t D_{t,i}. \quad \text{formula (2)}$$

When the capacitance change $\Delta C$ by the touch input is very small, the capacitance is not able to be estimated correctly in some cases due to influence of the noise as a second term of the formula (2).

Thus, in the touch panel device 1a of the present embodiment, when the object to be detected, which is at a position away from the surface of the touch panel, is detected, a plurality of driving signals provided to the respective drive lines $DL_1$ to $DL_M$ are switched to signals which mutually have high correlation. Simply, the same signal is provided to all the drive lines $DL_1$ to $DL_M$.

As an example thereof, a case where the same signal D1 is provided to all the drive lines $DL_1$ to $DL_M$ is indicated below.

In this case, the output signal of the differential amplifier 6 is provided by

[Expression 23]

$$Vout_t = 4MC_xVdD1_t\frac{C_{p1} - C_{p2}}{C_{int}(2MC_x + C_{p1} + C_{p2} + 2C_{int})}.$$

When the capacitance value is estimated by using D1 above,

[Expression 24]

$$\sum_{t=1}^{N} Vout_t D1_{tK} - \sum_{t=1}^{N} 4MC_xVdD1_t\frac{C_{p1} - C_{p2}}{C_{int}(2MC_x + C_{p1} + C_{p2} + 2C_{int})}D1_t = 4NMC_xVd\frac{C_{p1} - C_{p2}}{C_{int}(2MC_x + C_{p1} + C_{p2} + 2C_{int})}$$

and the same result as that of the formula (1) is obtained.

Here, when considering a case where the noise Vn is included in the output signal of the differential amplifier 6, the estimation value in this case is provided by

[Expression 25]

$$\sum_{t=1}^{N}(Vout_t + Vn_t)D_{t,K} = 4NMC_x Vd \frac{C_{p1} - C_{p2}}{C_{int}(2MC_x + C_{p1} + C_{p2} + 2C_{int})} + \sum_{t=1}^{N} Vn_t D_{t,K}.$$

Similarly to the above, when it is assumed that the object to be detected is at a position away from the surface of the touch panel, the capacitance between one of the sense lines and the GND changes by ΔC, and $C_{p1}=C_{p2}=C_p \gg \Delta C$, the estimation value is provided by

[Expression 26]

$$2NMC_x Vd \frac{\Delta C}{C_{int}(MC_x + C_p + C_{int})} + \sum_{t=1}^{N} Vn_t D_{t,K}. \quad \text{formula (3)}$$

When correlation between the noise Vn and the code sequences provided to each of the drive lines $DL_1$ to $DL_M$ is low enough, the influence of the noise becomes about $1/\sqrt{M}$ of the result of the formula (2) and the estimation of the capacitance value is able to be performed more correctly.

As above, with the touch panel device 1a, it is possible to detect a touch input by an object to be detected, which is at a position slightly away from the surface of the touch panel 2, more correctly.

Embodiment 2

Figure 6:
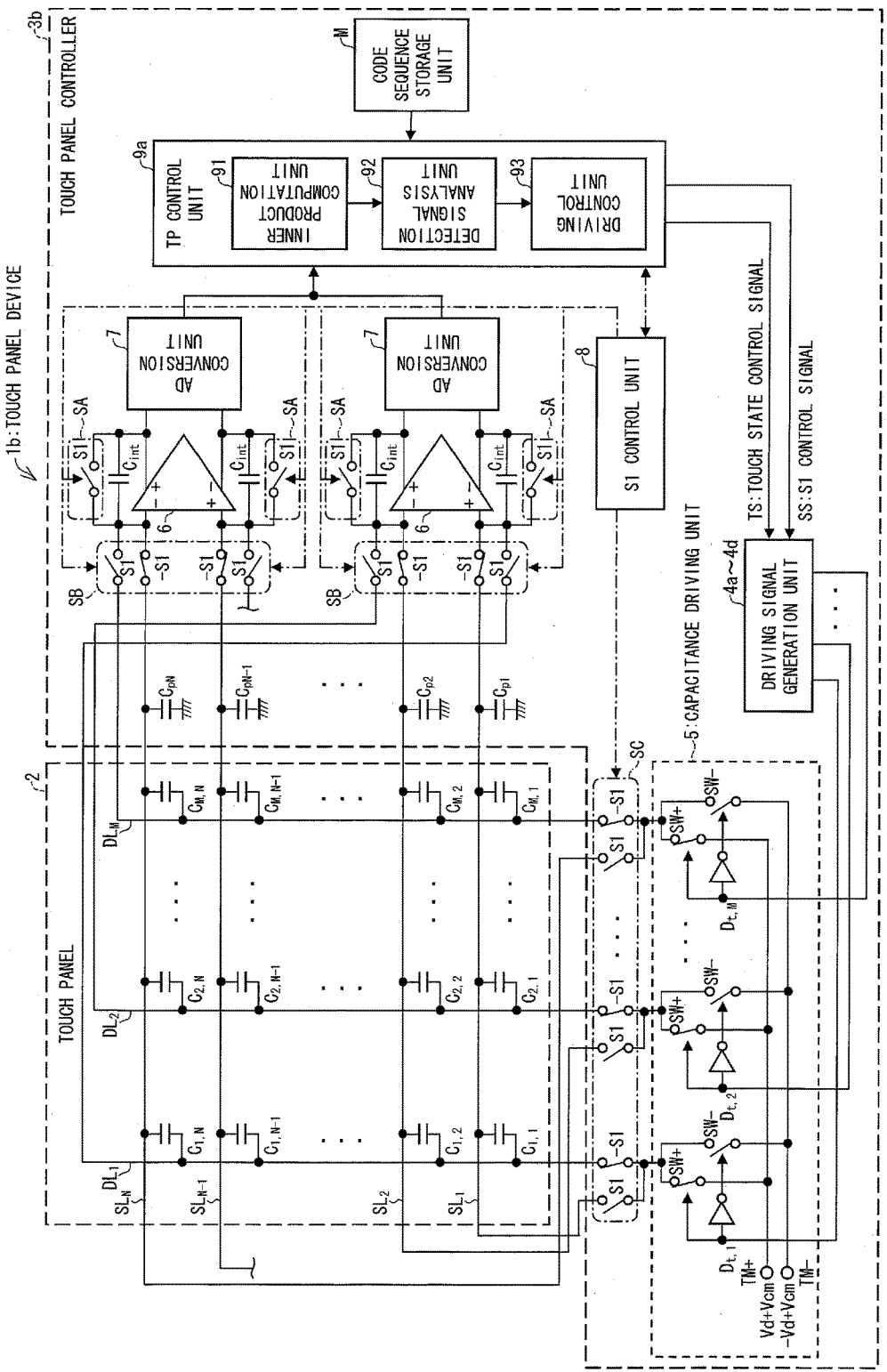
FIG. 6 is a circuit diagram illustrating a configuration of a touch panel device according to Embodiment 2 of the invention.
Figure 7:
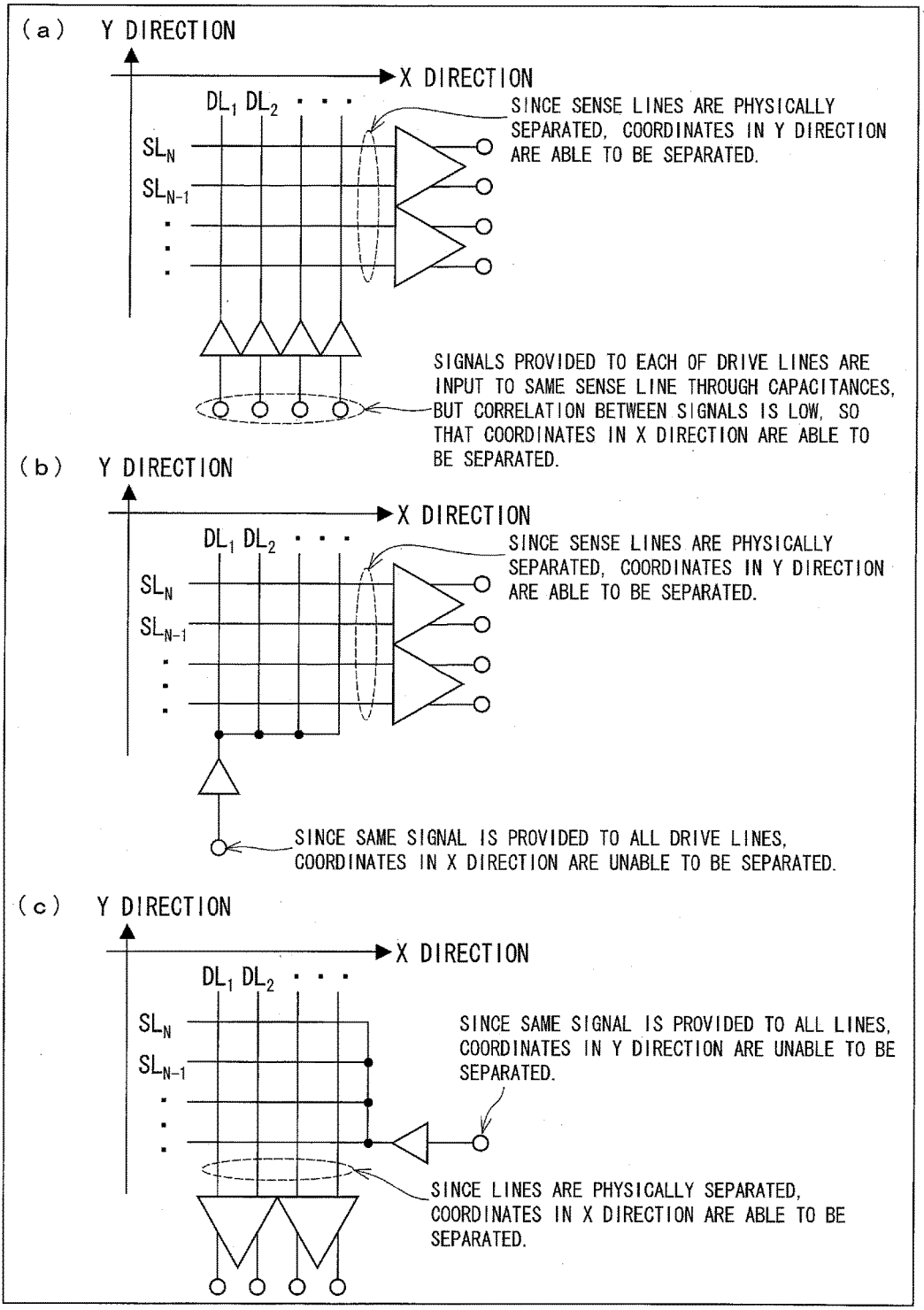
FIG. 7 is a view for explaining a detection function of a coordinate of a touch input by the touch panel devices according to Embodiment 1 and Embodiment 2 above, in which (a) illustrates a state of the touch panel device when an object to be detected, which is associated with a touch input (touch operation), is in contact with a surface of a touch panel or not in contact therewith but has a sufficiently short distance therefrom, (b) illustrates a state of the touch panel device when the object to be detected exists at a position away from the surface of the touch panel, and (c) illustrates another state of the touch panel device when the object to be detected exists at a position away from the surface.

FIG. 6 is a circuit diagram illustrating a configuration of a touch panel device (integrated circuit) 1b according to Embodiment 2. The touch panel device 1a indicated in Embodiment 1 above has a problem that when the sense line direction is an X axis and the drive line direction is a Y axis, a coordinate in the Y-axis direction is able to be detected, but a coordinate in the X-axis direction is not able to be detected. Thus, first, the aforementioned problem will be described in detail based on FIG. 7. FIG. 7 is a view for explaining a detection function of a coordinate of a touch input by the touch panel devices according to Embodiment 1 and Embodiment 2 above.

(a) of FIG. 7 illustrates a state of the touch panel device 1a when an object to be detected, which is associated with a touch input (touch operation), is in contact with the surface of the touch panel 2 or not in contact therewith but has a sufficiently short distance therefrom. At this time, since the sense lines $SL_1$ to $SL_N$ are physically separated, coordinates in the Y direction are able to be separated. On the other hand, each of a plurality of driving signals provided to each of the drive lines $DL_1$ to $DL_M$ is input to the same sense line through a plurality of electrostatic capacitances, but correlation between the plurality of driving signals (code sequences) is low, so that coordinates in the X direction are able to be separated.

Next, (b) of FIG. 7 illustrates a state of the touch panel device when the object to be detected, which is associated with the touch input, exists at a position away from the surface of the touch panel. At this time, it is similar to the case of (a) of FIG. 7 in that since the sense lines $SL_1$ to $SL_N$ are physically separated, coordinates in the Y direction are able to be separated. In this case, however, since the same signal is provided to each of the drive lines $DL_1$ to $DL_M$, an additional problem is caused that the coordinates in the X direction become unable to be separated.

Next, a case where a function of the drive lines $DL_1$ to $DL_M$ and a function of the sense lines $SL_1$ to $SL_N$ in (b) of FIG. 7 are switched as illustrated in (c) of FIG. 7 is considered. In this case, since the same signal is provided to each of the sense lines $SL_1$ to $SL_N$, coordinates in the Y direction become unable to be separated. However, since the drive lines $DL_1$ to $DL_M$ are physically separated, coordinates in the X direction become able to be separated.

Thus, the present inventor has considered that the aforementioned additional problem is able to be solved by combining an aspect of (b) of FIG. 7 above and the aspect of (c) of FIG. 7 above when the object to be detected, which is associated with the touch input, exists at the position away from the surface of the touch panel.

The touch panel device 1b of the present embodiment is capable of switching the function of the drive lines $DL_1$ to $DL_M$ and the function of the sense lines $SL_1$ to $SL_N$ by switching opening and closing of switches controlled with the S1 control signal SS included in a switch group SB and a switch group SA (switches controlled with the control signal S1 and switches controlled with the control signal −S1). Note that, opening and closing of each of switches included in the switch group SA to a switch group SC are controlled by the S1 control unit 8.

The capacitance driving unit 5 drives the plurality of drive lines $DL_1$ to $DL_M$ in parallel to cause a linear sum signal (different linear sum signal) based on (derived from) charges accumulated in each of a plurality of electrostatic capacitances $C_{Y,1}$ to $C_{Y,N}$ arranged in a corresponding row Y to be output from at least one drive line $DL_Y$ in the touch panel 2.

As above, with the touch panel device 1b, it is possible to detect a coordinate associated with a two-dimensional touch input with two directions of the sense line direction and the drive line direction (the X direction and the Y direction) as a reference.

Embodiment 3

Further, the present inventor newly found that influence of noise is able to be further reduced in some cases by changing, according to a plurality of driving signals (code sequences) provided to the drive lines $DL_1$ to $DL_M$, each voltage of the sense lines $SL_1$ to $SL_N$ when the switches controlled with the control signal S1, which are connected in parallel between the input terminal and the output terminal of the differential amplifier 6, are turned ON. A touch panel device 1c illustrated in FIG. 8 indicates one example of a mode using the above points.

The touch panel device (integrated circuit) 1c of the present embodiment switches:

(1) a mode in which, when a linear sum signal is not output from a certain one sense line, a voltage according to a plurality of driving signals for driving the plurality of drive lines $DL_1$ to $DL_M$ in parallel is applied to an output side of the one sense line (non-output mode), and (2) a mode in which, when a linear sum signal is output from the one sense line, the voltage according to the plurality of driving signals is not applied to the output side of the one sense line (output mode).

The S1 control unit (switching control unit) 8 allows the switching above by controlling opening and closing of each of the switches included in the switch groups SA to SC (switching means).

Figure 8:
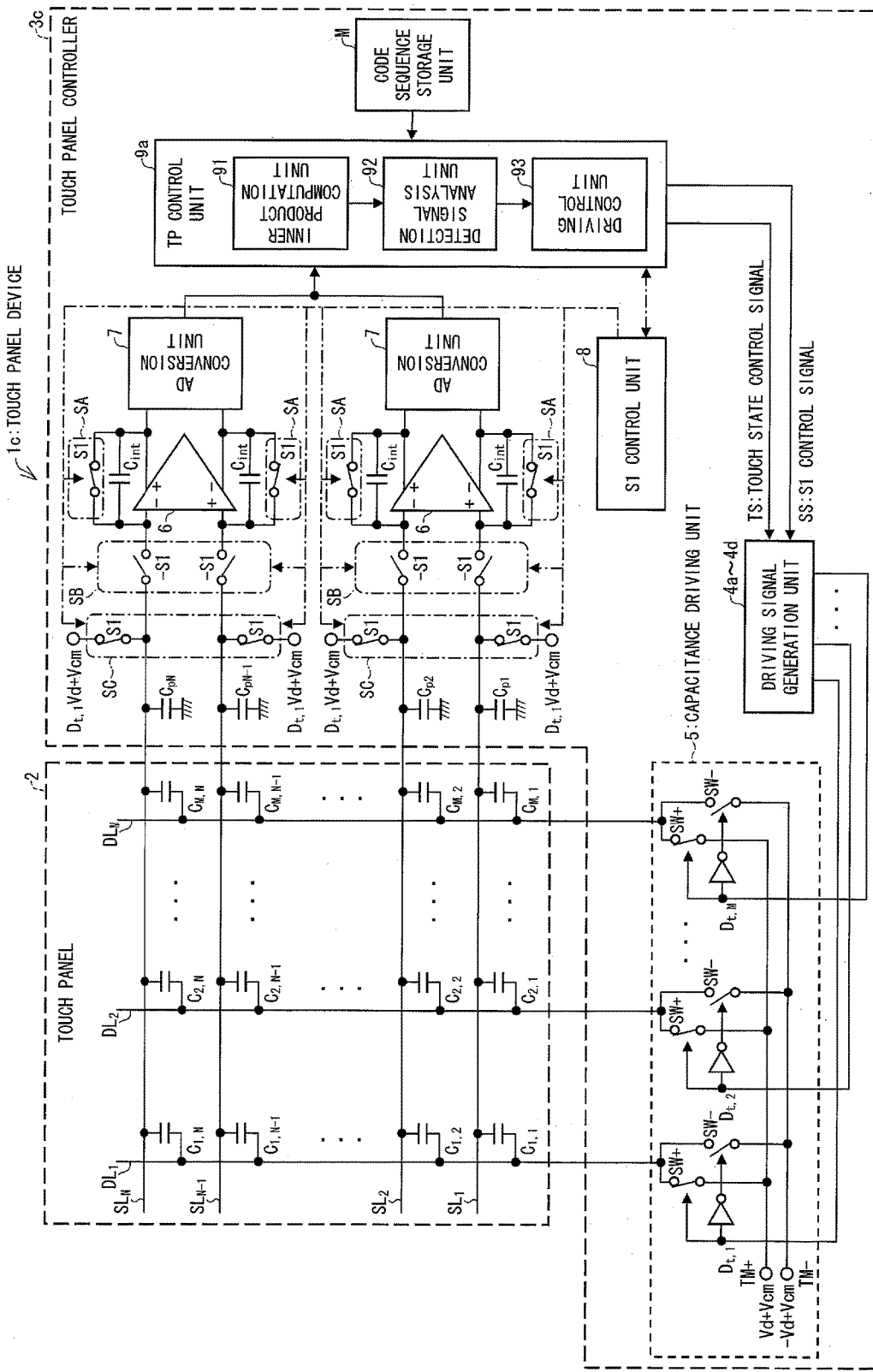
FIG. 8 is a circuit diagram illustrating a configuration of a touch panel device according to Embodiment 3 of the invention.

More specifically, as illustrated in FIG. 8, when the switches controlled with the control signal S11, which are included in the switch group SA, are turned ON, the switches controlled with the control signal −S1, which are included in the switch group SB, are turned OFF, and the switches controlled with the control signal S1, which are included in the switch group SC, are turned ON, the voltage of all the drive lines $DL_1$ to $DL_M$ and the voltage of all the sense lines $SL_X$ become the same (=Vd+Vcm), so that charges are not accumulated in the plurality of electrostatic capacitances $C_{1,X}$ to $C_{M,X}$ arranged in the row X (capacitance array), but charges are accumulated in the ground capacitances $C_{p1}$ and $C_{p2}$ (as to an amount of charges, refer to $Q1a_t$ and $Q2a_t$ described below).

On the other hand, when the switches controlled with the control signal S1, which are included in the switch group SA, are turned OFF, the switches controlled with the control signal −S1, which are included in the switch group SB, are turned ON, and the switches controlled with the control signal S1, which are included in the switch group SC, are turned OFF, charges are distributed to the capacitance $C_{int}$ of the differential amplifier 6, the plurality of electrostatic capacitances $C_{1,X}$ to $C_{M,X}$ arranged in the row X (capacitance array) and the ground capacitances Cp1 and Cp2. An output of the differential amplifier 6 here ($Vout_t$ described below) serves as a signal to be transmitted to a next stage. This makes it possible to further reduce influence by noise when a touch input by an object to be detected, which is at a position slightly away from the surface of the touch panel 2, is detected, compared to a case where the switching above is not performed.

<Working Effect of Touch Panel Device 1c>

Next, a working effect of the touch panel device 1c will be described in detail by using FIG. 10.

Switches (switch group SB) for separating each of the sense lines $SL_1$ to $SL_N$ and the differential amplifier 6 when the switches controlled with the control signal S1, which are included in the switch group SA, are turned ON are included, and further, a voltage which changes according to the code sequences D1 which are provided to the drive lines $DL_1$ to $DL_M$ is provided to the sense line $SL_X$. In this case, $Q1a_t$ and $Q2a_t$ above are provided by $$\begin{cases} Q1a_t = (D1_t Vd + Vcm)C_{p1} \\ Q2a_t = (D1_t Vd + Vcm)C_{p2} \end{cases}.$$

On the other hand, $Q1b_t$ and $Q2b_t$ above are provided by

[Expression 28]

$$\begin{cases} Q1b_t = \sum_{i=1}^{M}(Vs1_t + D_{t,i}Vd)C_{i,1} + (Vs1_t + Vcm)C_{p1} + (Vs1_t - Voutm_t)C_{int} \\ Q2b_t = \sum_{i=1}^{M}(Vs2_t + D_{t,i}Vd)C_{i,2} + (Vs2_t + Vcm)C_{p2} + (Vs2_t - Voutp_t)C_{int} \end{cases}.$$

Here, since $Q1a_t = Q1b_t$ and $Q2a_t = Q2b_t$ are respectively established,

[Expression 29]

$$\begin{cases} (D1_t Vd + Vcm)C_{p1} = \sum_{i=1}^{M} \dfrac{(Vs1_t + D_{t,i}Vd)C_{i,1} + (Vs1_t + Vcm)}{C_{p1} + (Vs1_t - Voutm_t)C_{int}} \\ (D1_t Vd + Vcm)C_{p2} = \sum_{i=1}^{M} \dfrac{(Vs2_t + D_{t,i}Vd)C_{i,2} + (Vs2_t + Vcm)}{C_{p2} + (Vs2_t - Voutp_t)C_{int}} \end{cases}.$$

This formula is modified as follows:

[Expression 30]

$$\begin{cases} Voutm_t C_{int} + D1_t Vd\left(C_{p1} - \sum_{i=1}^{M} C_{i,1}\right) = \left(\sum_{i=1}^{M} C_{i,1} + C_{p1} + C_{int}\right)Vs1_t \\ Voutp_t C_{int} + D1_t Vd\left(C_{p2} - \sum_{i=1}^{M} C_{i,1}\right) = \left(\sum_{i=1}^{M} C_{i,1} + C_{p2} + C_{int}\right)Vs2_t \end{cases}$$

[Expression 31]

$$\begin{cases} \dfrac{Voutm_t C_{int} + D1_t Vd\left(C_{p1} - \sum_{i=1}^{M} C_{i,1}\right)}{\left(\sum_{i=1}^{M} C_{i,1} + C_{p1} + C_{int}\right)} = Vs1_t \\ \dfrac{Voutp_t C_{int} + D1_t Vd\left(C_{p2} - \sum_{i=1}^{M} C_{i,1}\right)}{\left(\sum_{i=1}^{M} C_{i,1} + C_{p2} + C_{int}\right)} = Vs2_t \end{cases}$$

[Expression 32]

$$\dfrac{Voutp_t C_{int} + D1_t Vd\left(C_{p2} - \sum_{i=1}^{M} C_{i,1}\right)}{\left(\sum_{i=1}^{M} C_{i,1} + C_{p2} + C_{int}\right)} -$$

$$\dfrac{Voutm_t C_{int} + D1_t Vd\left(C_{p1} - \sum_{i=1}^{M} C_{i,1}\right)}{\left(\sum_{i=1}^{M} C_{i,1} + C_{p1} + C_{int}\right)} = Vs2_t - Vs1_t \sim 0$$

[Expression 33]

$$\left(Voutp_t C_{int} + D1_t Vd\left(C_{p2} - \sum_{i=1}^{M} C_{i,1}\right)\right)\left(\sum_{i=1}^{M} C_{i,1} + C_{p1} + C_{int}\right) -$$

$$\left(-Voutp_t C_{int} + D1_t Vd\left(C_{p1} - \sum_{i=1}^{M} C_{i,1}\right)\right)\left(\sum_{i=1}^{M} C_{i,1} + C_{p2} + C_{int}\right) = 0$$

[Expression 34]

$$Voutp_t C_{int}\left(2\sum_{i=1}^{M} C_{i,1} + C_{p1} + C_{p2} + 2C_{int}\right) =$$

$$\left(D1_t Vd\left(C_{p1} - \sum_{i=1}^{M} C_{i,1}\right)\right)\left(\sum_{i=1}^{M} C_{i,1} + C_{p2} + C_{int}\right) -$$

$$\left(D1_t Vd\left(C_{p2} - \sum_{i=1}^{M} C_{i,1}\right)\right)\left(\sum_{i=1}^{M} C_{i,1} + C_{p1} + C_{int}\right)$$

[Expression 35]

$$Vout_t = 2\dfrac{\left(D1_t Vd\left(C_{p1} - \sum_{i=1}^{M} C_{i,1}\right)\right)\left(\sum_{i=1}^{M} C_{i,1} + C_{p2} + C_{int}\right) - \left(D1_t Vd\left(C_{p2} - \sum_{i=1}^{M} C_{i,1}\right)\right)\left(\sum_{i=1}^{M} C_{i,1} + C_{p1} + C_{int}\right)}{C_{int}\left(2\sum_{i=1}^{M} C_{i,1} + C_{p1} + C_{p2} + 2C_{int}\right)}.$$

Here, when considering a case where the capacitances between the sense lines and the drive lines are uniform (=Cx),

[Expression 36]

$$Vout_t = 2\frac{(D1_t Vd(C_{p1} - MC_x))(MC_x + C_{p2} + C_{int}) - (D1_t Vd(C_{p2} - MC_x))(MC_x + C_{p1} + C_{int})}{C_{int}(2MC_x + C_{p1} + C_{p2} + 2C_{int})}$$

When the capacitance is estimated by using D1 above,

[Expression 37]

$$\sum_{t=1}^{N} Vout_t D1_{t,K} = \sum_{t=1}^{N} 2\frac{(D1_t Vd(C_{p1} - MC_x))(MC_x + C_{p2} + C_{int}) - (D1_t Vd(C_{p2} - MC_x))(MC_x + C_{p1} + C_{int})}{C_{int}(2MC_x + C_{p1} + C_{p2} + 2C_{int})} D1_t$$

$$= 2N\frac{Vd(C_{p1} - MC_x)(MC_x + C_{p2} + C_{int}) - Vd(C_{p2} - MC_x)(MC_x + C_{p1} + C_{int})}{C_{int}(2MC_x + C_{p1} + C_{p2} + 2C_{int})}$$

is provided.

Next, it is assumed that a touch input (object to be detected) is at a position away from the surface of the touch panel 2, the potential of the touch input is GND, the capacitance between one of the sense lines and the GND changes by ΔC, and $C_{p1} = C_{p2} = C_p \gg \Delta C$.

At this time, an estimation value of the capacitance value is obtained by

[Expression 38]

$$2N\frac{Vd(C_p + \Delta C - MC_x)(MC_x + C_p + C_{int}) - Vd(C_p - MC_x)(MC_x + C_p + C_{int})}{C_{int}(2MC_x + 2C_p + 2C_{int})} = \frac{NVd\Delta C}{C_{int}}.$$

When the electrostatic capacitance $C_p$ and the electrostatic capacitance $C_{int}$ are large, a coefficient by which the estimation value of the capacitance value is multiplied is able to be made larger in the configuration of the present embodiment compared to a first term of the formula (3) above, thus making it possible to further reduce influence of noise.

Embodiment 4

Figure 9:
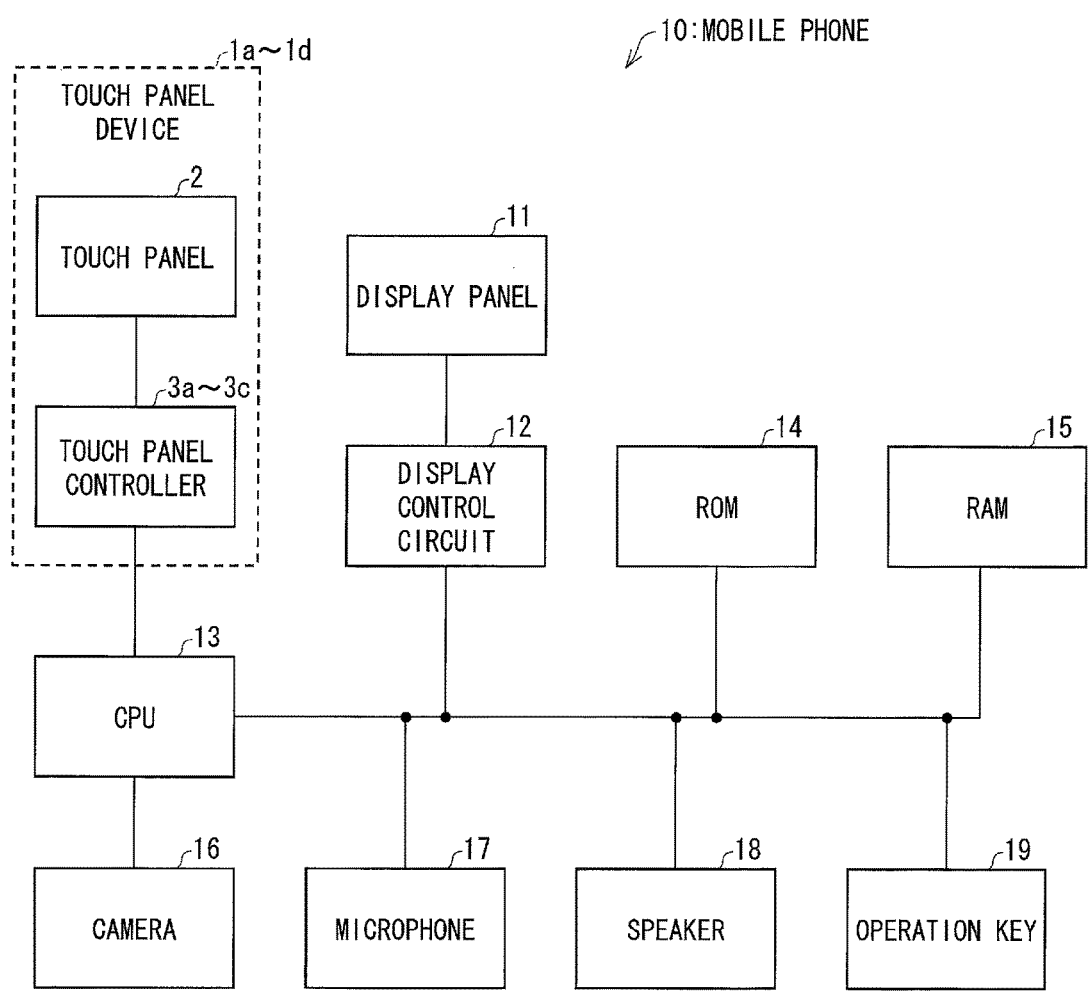
FIG. 9 is a circuit diagram illustrating a configuration of a mobile phone according to Embodiment 4 of the invention.

Next, as one example of an electronic device including any of the touch panel devices 1a to 1d according to Embodiments 1 to 3 and Embodiment 5 described below, a mobile phone (electronic device) 10 will be described with reference to FIG. 9. FIG. 9 is a block diagram illustrating a configuration of a main part of the mobile phone 10 according to the present embodiment.

<Configuration of Mobile Phone 10>

The mobile phone 10 according to the present embodiment includes, as illustrated in FIG. 9, the touch panel device 1a to 1d, a display panel 11, a display control circuit 12, a CPU 13, a ROM 14, a RAM 15, a camera 16, a microphone 17, a speaker 18 and an operation key 19. Respective components of the mobile phone 10 are mutually connected by a data bus.

The touch panel device 1 includes the touch panel 2 and the touch panel controllers 3a to 3c. Note that, the touch panel device 1a to 1d (the touch panel 2 and the touch panel controllers 3a to 3c) included in the mobile phone 10 according to the present embodiment is the same as any of the touch panel devices 1a to 1d according to Embodiments 1 to 3 and Embodiment 5 described below, thus description thereof will be omitted as appropriate.

The CPU 13 integrally controls an operation of the mobile phone 10. The CPU 13 controls the operation of the mobile phone 10, for example, by executing a program stored in the ROM 14. Note that, a mode in which the TP control unit 9a described above and a TP control unit 9b described below are provided independently from the CPU 13 is described in the present description, but an embodiment of the invention is not limited thereto. For example, the CPU 13 may have functions of the TP control units 9a and 9b in combination. In this case, configurations of the touch panel controllers 3a to 3c are able to be further simplified (refer to a mode of FIG. 12 described below).

The ROM (Read Only Memory) 14 is a readable and unwritable memory, for example, such as an EPROM (Erasable Programmable Read-Only Memory), which stores fixed data such as a program to be executed by the CPU 13.

The RAM (Random Access Memory) 15 is a readable and writable memory, for example, such as a flash memory, which stores data to be referred to for computation by the CPU 13 and variable data such as data generated by the CPU 13 with computation.

The operation key 19 receives an input of an instruction by a user to the mobile phone 10. Data input through the operation key 19 is stored in the RAM 15 in a volatile manner.

The camera 16 photographs an object based on a photographing instruction input by the user through the operation key 19. Image data of the object photographed by the camera 16 is stored in the RAM 15, an external memory (for example, a memory card) or the like.

The microphone 17 receives an input of a voice of the user. The voice data indicating the input voice of the user (analog data) is converted into digital data by the mobile phone 10 and sent to another mobile phone (communication partner).

The speaker 18 outputs a sound represented by music data stored, for example, in the RAM 15 or the like.

The display control circuit 12 drives the display panel 11 so as to display an image represented by image data stored in the ROM 14, the RAM 15 or the like based on a user instruction input through the operation key 19. The display panel 11 may be provided being overlapped with the touch panel 2 or may incorporate the touch panel 2, and a configuration thereof is not particularly limited.

Further, the mobile phone 10 may further include an interface (IF) (not illustrated) for connecting with other electronic device in a wired manner.

The mobile phone 10 according to the present embodiment is able to perform estimation of electrostatic capacitances more correctly by including any of the touch panel devices 1a to 1d, so that the touch panel controllers 3a to 3c are able to be operated more excellently. Accordingly, the mobile phone 10 is able to recognize a touch operation by a user more correctly, thus making it possible to execute processing desired by the user more correctly.

Embodiment 5

Figure 11:
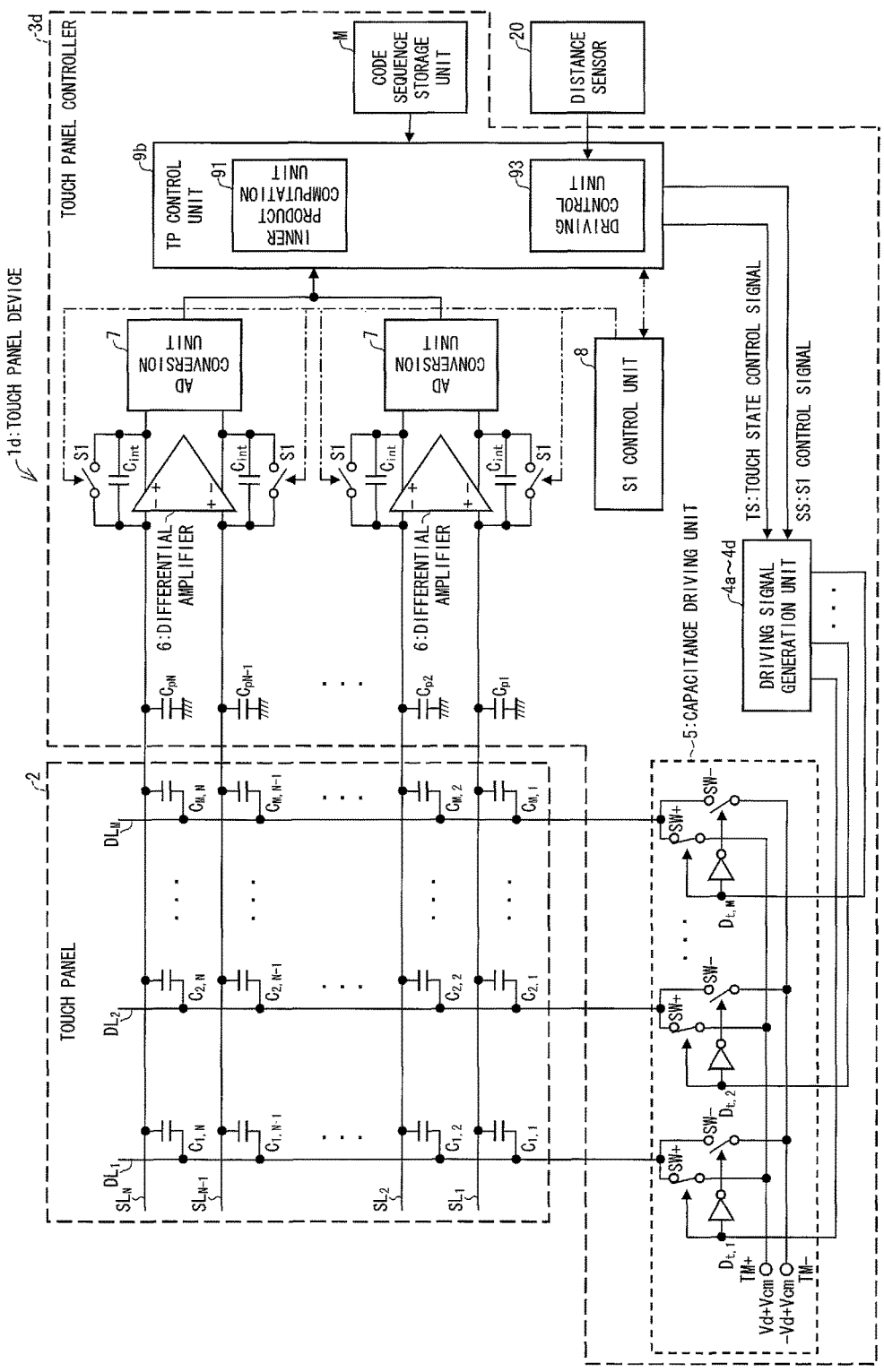
FIG. 11 is a circuit diagram illustrating a configuration of a touch panel device according to Embodiment 5 of the invention.

Next, a configuration of a touch panel device (integrated circuit) 1d according to Embodiment 5 of the invention will be described based on FIG. 11.

The touch panel device $1d$ of the present embodiment is provided with a distance sensor 20 (or distance measurement sensor) instead of the detection signal analysis unit 92 of Embodiment 1.

Therefore, the TP control unit $9b$ of the touch panel device $1d$ is composed of only the inner product computation unit 91 and the driving control unit (correlation control unit, distance deciding unit) 93.

The driving control unit 93 of the present embodiment decides whether or not a detection distance detected by the distance sensor 20 is longer than the predetermined threshold. Further, the driving control unit 93 performs control for switching high and low of correlation of code sequences output by the driving signal generation units $4a$ to $4d$, according to a decision result as to whether or not the detection distance is longer than the threshold. Thus, by checking an association relation between a detection signal and the detection distance by the distance sensor 20 in advance, it becomes possible to decide whether or not the detection distance is longer than the threshold.

Note that, the present embodiment assumes, for example, a mode in which an imaging element (one example of the distance measurement sensor) is provided in a vicinity of a display panel and a touch state in a vicinity of the display panel is recognized by image analysis for an image photographed by the imaging element, but an embodiment of the invention is not limited thereto. For example, when a touch panel device incorporates a plurality of imaging elements arranged in a manner of a matrix, the imaging elements serve as one example of the distance measurement sensor.

Embodiment 6

Figure 12:
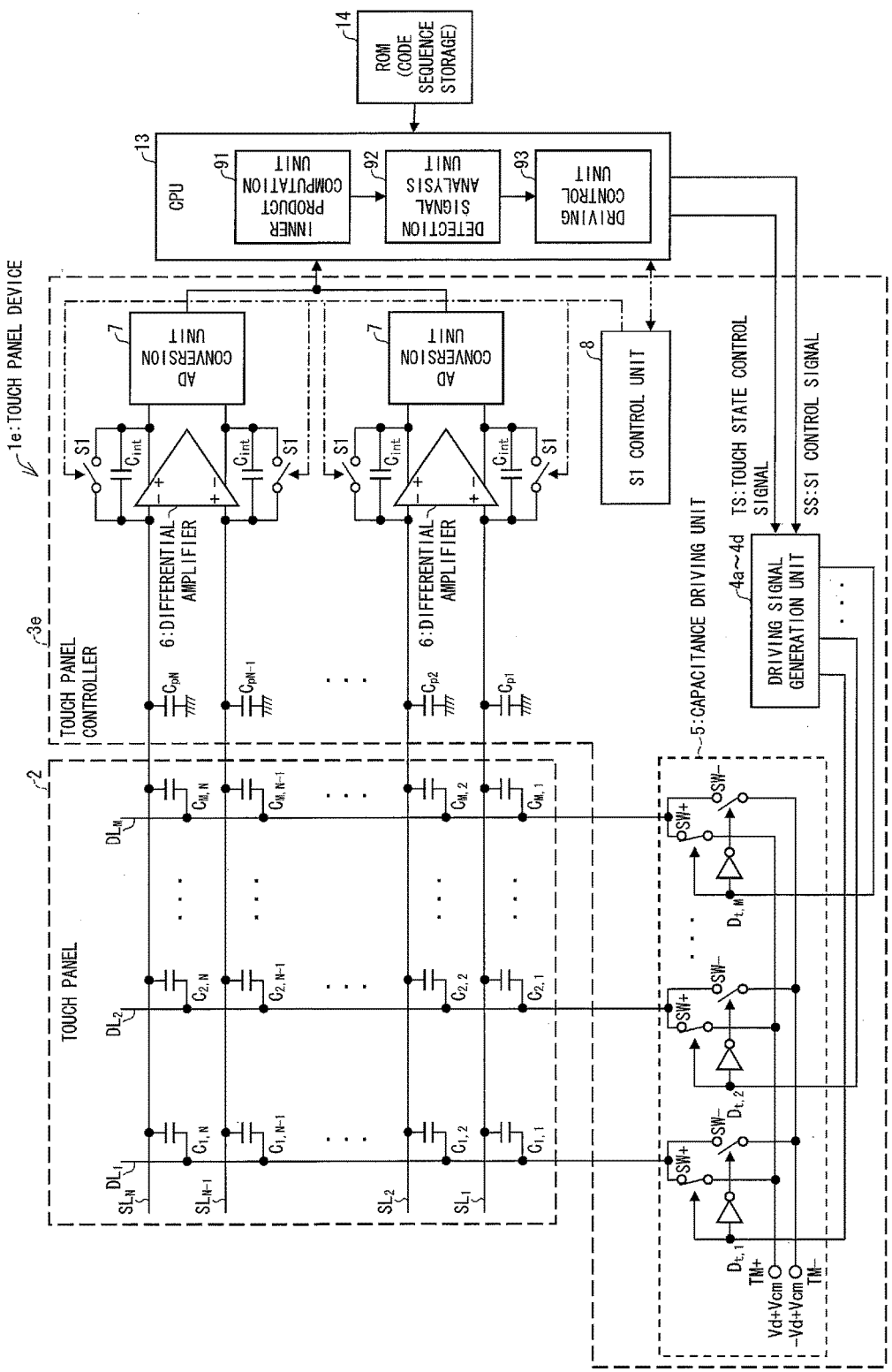
FIG. 12 is a circuit diagram illustrating a configuration of a touch panel device according to Embodiment 6 of the invention.

Next, a configuration of a touch panel device (integrated circuit) $1e$ according to Embodiment 6 of the invention will be described based on FIG. 12.

As the touch panel device $1e$ of the present embodiment, a mode in which the TP control unit $9a$ and the code sequence storage unit M are excluded from the configuration of the inside of the touch panel controller $3a$ of Embodiment 1, and the external CPU 13 of the touch panel device $1e$ has the function of the TP control unit $9a$ and the external ROM 14 has the function of the code sequence storage unit M instead is indicated.

That is, output data from the AD conversion unit 7 is directly input to the CPU 13 and the CPU 13 performs various information processing (processing similar to processing of the inner product computation unit 91, the detection signal analysis unit 92 and the driving control unit 93 described above) to control the S1 control unit 8 and the driving signal generation units $4a$ to $4d$, which are inside the touch panel controller $3e$.

According to the touch panel device $1e$ of the present embodiment, because the TP control unit or the code sequence storage unit does not need to be provided inside the touch panel controller, a configuration of the touch panel controller itself is able to be significantly simplified accordingly.

Note that, the mode in which the TP control unit $9a$ and the code sequence storage unit M are excluded from the configuration of the inside of the touch panel controller $3a$ of Embodiment 1 is indicated in the present embodiment, but an embodiment of the invention is not limited thereto. For example, a mode in which the TP control unit $9a$ and the code sequence storage unit M are excluded from the touch panel controllers $3b$ to $3d$ of Embodiments 2 to 3 and 5, and the external CPU 13 has the function of the TP control unit $9a$ and the external ROM 14 has the function of the code sequence storage unit M is also included in the range of the invention.

[Summary]

A touch panel controller ($3a$ to $3c$) according to an aspect 1 of the invention includes: a capacitance driving unit (5) which causes a linear sum signal based on charges, which are accumulated in a plurality of electrostatic capacitances arranged in a corresponding row, to be output from at least one sense line of a touch panel including a plurality of drive lines ($DL_1$ to $DL_M$) in which respective columns of a plurality of electrostatic capacitances ($C_{11}$ to $C_{MN}$) arranged in a matrix manner are arranged and a plurality of sense lines ($SL_1$ to $SL_N$) in which respective rows of the plurality of electrostatic capacitances are arranged, by driving the plurality of drive lines in parallel; a driving signal generation unit which outputs each of a plurality of driving signals for driving the plurality of drive lines in parallel to the capacitance driving unit by using code sequences; and a correlation control unit (driving control unit 93) which performs control to switch high and low of correlation of the code sequences according to a detection distance which is a distance between a surface of the touch panel and an object to be detected.

According to the aforementioned configuration, the correlation control unit switches high and low of the correlation of the code sequences according to the detection distance. The detection distance is a distance between the surface of the touch panel and the object to be detected thereof. Here, the present inventor newly found that, when a touch input by an object to be detected, which is at a position (slightly) away from the surface of the touch panel, is detected, by increasing a level of the correlation of the code sequences, influence of noise with respect to a detection signal of the touch input (hereinafter, referred to as a touch signal) is able to be reduced compared to a case where the correlation of the code sequences is not changed. Accordingly, with the aforementioned configuration, it is possible to detect a touch input by an object to be detected, which is at a position slightly away from the surface of the touch panel, more correctly.

In a touch panel controller according to an aspect 2 of the invention, the correlation control unit, when the detection distance is a predetermined threshold or less, may cause the driving signal generation unit to output low-correlation code sequences, which mutually have low correlation, as the code sequences, and when the detection distance is more than the threshold, may cause the driving signal generation unit to output high-correlation code sequences, which mutually have high correlation compared to the low-correlation code sequences, as the code sequences, in the aspect 1.

According to the aforementioned configuration, the correlation control unit, when the detection distance is longer than the predetermined threshold, causes the driving signal generation unit to output the high-correlation code sequences, which mutually have high correlation compared to the low-correlation code sequences, as the code sequences. Here, the "predetermined threshold" is a threshold which is set for discriminating "a case where a touch input is in contact with the touch panel surface or not in contact therewith but has a sufficiently short distance therefrom" and "a case where the touch input is away from the touch panel surface". Thus, compared to a case where the correlation of the code sequences is not changed, influence of noise when a touch input by an object to be detected, which is at a position slightly away from the surface of the touch panel, is detected is able to be reduced.

In a touch panel controller according to an aspect 3 of the invention, the capacitance driving unit may output a different linear sum signal based on charges, which are accumulated in a plurality of electrostatic capacitances arranged in a corresponding column, from at least one drive line in the touch panel by driving the plurality of sense lines in parallel, and the driving signal generation unit may cause the capacitance driving unit to output the different linear sum signal by driving the plurality of sense lines in parallel, in the aspect 1 or 2.

According to the aforementioned configuration, it is possible to detect a coordinate associated with a two-dimensional touch input with two directions of a sense line direction and a drive line direction as a reference.

A touch panel controller according to an aspect 4 of the invention may include a switching control unit (S1 control unit 8) which switches an output mode in which the linear sum signal is output from the one sense line and a non-output mode in which the linear sum signal is not output from the one sense line, and performs control, when having switched to the non-output mode, so as to apply a voltage according to the plurality of driving signals for driving the plurality of drive lines in parallel to an output side of the one sense line, and when having switched to the output mode, so as not to apply the voltage according to the plurality of driving signals to the output side of the one sense line, in the aspects 1 to 3.

According to the aforementioned configuration, compared to a case where switching of each of the modes above is not performed, influence of noise when a touch input by an object to be detected, which is at a position slightly away from the surface of the touch panel, is detected is able to be reduced.

In a touch panel controller according to an aspect 5 of the invention, the driving signal generation unit may include a linear feedback shift register (41) which outputs M-sequence codes and a plurality of shift registers (42; 1 to M) provided correspondingly to the plurality of drive lines, and may bit-shift the M-sequence codes output from the linear feedback shift register by each of the plurality of shift registers to thereby generate the low-correlation code sequences of a plurality of types, and increase a level of the correlation of the code sequences by providing mutually same signals to each of the plurality of drive lines as the plurality of driving signals, in the aspect 2.

According to the aforementioned configuration, it is possible to switch high and low of correlation of code sequences with a simple configuration.

A touch panel controller according to an aspect 6 of the invention may include an inner product computation unit (91) which estimates a capacitance value of each of a plurality of electrostatic capacitances arranged in a corresponding row of the one sense line by inner product computation of the linear sum signal and the code sequences, in the aspects 1 to 5.

According to the aforementioned configuration, it is possible to estimate the capacitance value of each of the plurality of electrostatic capacitances arranged in the corresponding row of the one sense line by reducing influence by noise when a touch input by an object to be detected, which is at a position slightly away from the surface of the touch panel, is detected.

A touch panel controller according to an aspect 7 of the invention may include a distance deciding unit (detection signal analysis unit 92, driving control unit 93) which decides whether or not the detection distance is longer than the threshold, in which control of switching high and low of the correlation of the code sequences output by the driving signal generation unit may be performed according to a decision result of the correlation control unit, in the aspect 6.

A touch signal detected by the touch panel has a narrow signal range and has a high signal level when a detection distance is short (when a distance between the surface of the touch panel and the object to be detected is close). On the other hand, when the detection distance is long (when the distance between the surface of the touch panel and the object to be detected is far), the signal range tends to be wide and the signal level tends to be low. Thus, for example, by checking an association relation between the detection distance and the touch signal in advance by using the tendency as described above, it becomes possible to decide whether or not the detection distance is longer than the threshold.

An integrated circuit, a touch panel device and an electronic device including the touch panel controller according to any of the aspects 1 to 7 are also included in the scope of the invention.

[Other Expression of Invention]

The invention is also able to be expressed as follows.

That is, a touch panel controller according to one aspect of the invention may be a touch panel controller including a driving unit (capacitance driving unit) which drives M electrostatic capacitances, which are respectively formed between M drive lines (M is an integer of 2 or more) and one sense line, in parallel with a signal based on code sequences, and causes a linear sum signal based on charges, which are accumulated in the M electrostatic capacitances, to be output from the sense line, which may include an inner product computation unit which estimates values of the M electrostatic capacitances by performing inner product computation of the linear sum signal and code sequences, and in which a case where first code sequences which mutually have low correlation are used as the code sequences and a case where different code sequences which mutually have high correlation compared to the first code sequences are used may be switched.

A touch panel controller according to one aspect of the invention may be the aforementioned touch panel controller, in which the sense line and the drive lines may be switched.

A touch panel controller according to one aspect of the invention is any of the aforementioned touch panel controllers, in which a voltage of a terminal whose electrostatic capacitance is not driven may be controlled according to a signal for driving electrostatic capacitances.

An integrated circuit according to one aspect of the invention may integrate any of the aforementioned touch panel controllers.

A touch panel device according to one aspect of the invention may include any of the aforementioned touch panel controllers and a touch panel controlled by the touch panel controller.

An electronic device according to one aspect of the invention may include any of the aforementioned touch panel controllers and a touch panel controlled by the touch panel controller.

[Additional Notes]

The invention is not limited to each of the embodiments described above and can be modified variously within the scope defined by the claims, and embodiments obtained by appropriately combining technical means disclosed in different embodiments are also included in the technical scope of the invention. Further, by combining the technical means disclosed in each of the embodiments, a new technical feature may be formed.

INDUSTRIAL APPLICABILITY

The invention is able to be used for a touch panel controller which drives a plurality of drive lines in parallel to estimate or detect electrostatic capacitances which are formed in a matrix manner, and an electronic device using the same. The invention is also applicable to a fingerprint detection system.

REFERENCE SIGNS LIST 1a to 1e touch panel device (integrated circuit)
2 touch panel
3a to 3e touch panel controller
4a to 4d driving signal generation unit
5 capacitance driving unit
8 S1 control unit (switching control unit)
10 mobile phone (electronic device)
20 distance sensor
41 linear feedback shift register
42 shift register (1 to M)
91 inner product computation unit
92 detection signal analysis unit (distance deciding unit)
93 driving control unit (correlation control unit, distance deciding unit)
$C_{int}$ electrostatic capacitance
$C_{M,N}$ electrostatic capacitance
$DL_M$ drive line
$SL_N$ sense line

The invention claimed is:

1. A touch panel controller, comprising:
a capacitance driving unit which causes a linear sum signal based on charges, which are accumulated in a plurality of electrostatic capacitances arranged in a corresponding row, to be output from at least one sense line of a touch panel including a plurality of drive lines in which respective columns of a plurality of electrostatic capacitances arranged in a matrix manner are arranged and a plurality of sense lines in which respective rows of the plurality of electrostatic capacitances are arranged, by driving the plurality of drive lines in parallel;
a driving signal generation unit which outputs each of a plurality of driving signals for driving the plurality of drive lines in parallel to the capacitance driving unit by using code sequences, wherein the code sequences include high-correlation code sequences and low-correlation code sequences; and
a correlation control unit which performs control to switch between high-correlation code sequences and low-correlation code sequences according to a detection distance which is a distance between a surface of the touch panel and an object to be detected.

2. The touch panel controller according to claim 1, wherein:
when the detection distance is shorter than a predetermined threshold, the correlation control unit causes the driving signal generation unit to output low-correlation code sequences, which mutually have low correlation, as the code sequences, and
when the detection distance is the threshold or more, the correlation control unit causes the driving signal generation unit to output high-correlation code sequences, which mutually have high correlation compared to the low-correlation code sequences, as the code sequences.

3. The touch panel controller according to claim 1,
wherein the capacitance driving unit outputs a different linear sum signal based on charges, which are accumulated in a plurality of electrostatic capacitances arranged in a corresponding column, from at least one drive line in the touch panel by driving the plurality of sense lines in parallel, and
wherein the driving signal generation unit causes the capacitance driving unit to output the different linear sum signal by driving the plurality of sense lines in parallel.

4. The touch panel controller according to claim 1, further comprising: a switching control unit which switches an output mode in which the linear sum signal is output from the at least one sense line and a non-output mode in which the linear sum signal is not output from the at least one sense line,
wherein the switching control unit performs control, when having switched to the non-output mode, so as to apply a voltage according to the plurality of driving signals for driving the plurality of drive lines in parallel to an output side of the at least one sense line, and
wherein the switching control unit performs control, when having switched to the output mode, so as not to apply the voltage according to the plurality of driving signals to the output side of the at least one sense line.

5. The touch panel controller according to claim 2, wherein the driving signal generation unit includes:
a linear feedback shift register which outputs M-sequence codes; and
a plurality of shift registers each provided correspondingly to each of the plurality of drive lines,
wherein the driving signal generation unit bit-shifts the M-sequence codes output from the linear feedback shift register by each of the plurality of shift registers to thereby generate a plurality of types of the low-correlation code sequences, and
wherein the driving signal generation unit increases a level of the correlation of the code sequences by providing mutually same signals to each of the plurality of drive lines as the plurality of driving signals.

6. The touch panel controller according to claim 1, further comprising:
an inner product computation unit which estimates a capacitance value of each of a plurality of electrostatic capacitances arranged in a corresponding row of the at least one sense line by inner product computation of the linear sum signal and the code sequences.

7. The touch panel controller according to claim 2, further comprising:
a distance deciding unit which decides whether or not the detection distance is longer than the threshold,
wherein the correlation control unit performs control to switch between high-correlation code sequences and low-correlation code sequences output by the driving signal generation unit according to a decision result of the distance deciding unit.

8. An integrated circuit comprising the touch panel controller according to claim 1.

9. A touch panel device comprising the touch panel controller according to claim 1.

10. An electronic device comprising the touch panel controller according to claim 1.

* * * * *